(12) United States Patent
Rangan

(10) Patent No.: US 8,719,257 B2
(45) Date of Patent: May 6, 2014

(54) METHODS AND SYSTEMS FOR AUTOMATICALLY GENERATING SEMANTIC/CONCEPT SEARCHES

(75) Inventor: Venkat Rangan, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 275 days.

(21) Appl. No.: 13/028,826

(22) Filed: Feb. 16, 2011

(65) Prior Publication Data

US 2012/0209847 A1    Aug. 16, 2012

(51) Int. Cl.
 *G06F 17/30*    (2006.01)
(52) U.S. Cl.
 USPC ............... 707/718; 707/776; 707/999.004
(58) Field of Classification Search
 USPC ......... 707/710, 715, 737, 739, 743, 749, 750, 707/718, 776, 999.003–999.006
 See application file for complete search history.

(56) References Cited

U.S. PATENT DOCUMENTS

| | | | |
|---|---|---|---|
| 5,418,951 A | 5/1995 | Damashek | |
| 6,092,038 A | 7/2000 | Kanevsky et al. | |
| 6,275,820 B1 | 8/2001 | Navin-Chandra et al. | |
| 6,385,602 B1 | 5/2002 | Tso et al. | |
| 6,493,663 B1 | 12/2002 | Ueda | |
| 6,751,607 B2 * | 6/2004 | Kraay et al. | 707/760 |
| 6,760,694 B2 | 7/2004 | Al-Kazily et al. | |
| 6,873,958 B2 | 3/2005 | Artinger | |
| 6,922,715 B2 * | 7/2005 | Kobayashi et al. | 708/520 |
| 6,993,535 B2 | 1/2006 | Bolle et al. | |
| 7,007,067 B1 | 2/2006 | Azvine et al. | |
| 7,185,000 B1 | 2/2007 | Brown et al. | |
| 7,219,130 B2 | 5/2007 | Kumar et al. | |
| 7,305,385 B1 | 12/2007 | Dzikiewicz et al. | |
| 7,421,690 B2 | 9/2008 | Forstall et al. | |
| 7,483,892 B1 * | 1/2009 | Sommer et al. | 1/1 |
| 7,539,725 B2 | 5/2009 | Nutkis | |
| 7,546,348 B2 | 6/2009 | Wilson et al. | |
| 7,593,995 B1 | 9/2009 | He et al. | |
| 7,599,831 B2 | 10/2009 | Ford | |
| 7,627,590 B2 | 12/2009 | Boguraev et al. | |
| 7,657,603 B1 | 2/2010 | He et al. | |
| 7,685,106 B2 | 3/2010 | Brooks et al. | |
| 7,698,346 B2 | 4/2010 | Henderson | |
| 7,730,081 B2 | 6/2010 | Bromm et al. | |
| 7,743,051 B1 | 6/2010 | Kashyap et al. | |
| 7,761,524 B2 | 7/2010 | Carmel et al. | |
| 7,765,212 B2 | 7/2010 | Surendran et al. | |

(Continued)

OTHER PUBLICATIONS

Kerr, Bernard; Thread Arcs: An Email Thread Visualization, Collaborative User Experience Group IBM Research, 2003.

(Continued)

*Primary Examiner* — Marc Filipczyk
(74) *Attorney, Agent, or Firm* — Lowenstein Sandler LLP

(57) ABSTRACT

In various embodiments, a semantic space associated with a corpus of electronically stored information (ESI) may be created and used for concept searches. Documents (and any other objects in the ESI, in general) may be represented as vectors in the semantic space. Vectors may correspond to identifiers, such as, for example, indexed terms. The semantic space for a corpus of ESI can be used in information filtering, information retrieval, indexing, and relevancy rankings.

20 Claims, 21 Drawing Sheets

(56) References Cited

U.S. PATENT DOCUMENTS

| | | | |
|---|---|---|---|
| 7,899,871 B1 | 3/2011 | Kumar | |
| 8,024,344 B2 * | 9/2011 | Bradford | 707/739 |
| 8,032,598 B1 | 10/2011 | He et al. | |
| 8,392,409 B1 | 3/2013 | Kashyap | |
| 2002/0052870 A1 | 5/2002 | Charlesworth et al. | |
| 2002/0055936 A1 | 5/2002 | Cheng et al. | |
| 2002/0078158 A1 | 6/2002 | Brown et al. | |
| 2003/0023435 A1 | 1/2003 | Josephson | |
| 2003/0028580 A1 | 2/2003 | Kucherawy | |
| 2003/0101182 A1 | 5/2003 | Govrin et al. | |
| 2003/0110162 A1 | 6/2003 | Newman | |
| 2003/0167402 A1 | 9/2003 | Stolfo et al. | |
| 2003/0195937 A1 | 10/2003 | Kircher et al. | |
| 2003/0220922 A1 | 11/2003 | Yamamoto et al. | |
| 2004/0117740 A1 | 6/2004 | Chen et al. | |
| 2004/0128276 A1 | 7/2004 | Scanlon et al. | |
| 2004/0133564 A1 | 7/2004 | Gross et al. | |
| 2004/0143569 A1 | 7/2004 | Gross et al. | |
| 2004/0148280 A1 | 7/2004 | Chimura | |
| 2004/0220925 A1 | 11/2004 | Liu et al. | |
| 2004/0221295 A1 | 11/2004 | Kawai et al. | |
| 2004/0249709 A1 | 12/2004 | Donovan et al. | |
| 2004/0260534 A1 | 12/2004 | Pak et al. | |
| 2005/0055359 A1 | 3/2005 | Kawai et al. | |
| 2005/0097321 A1 | 5/2005 | Zhu et al. | |
| 2005/0144245 A1 | 6/2005 | Lowe | |
| 2005/0154580 A1 | 7/2005 | Horowitz et al. | |
| 2005/0198175 A1 | 9/2005 | Thomas et al. | |
| 2005/0223061 A1 | 10/2005 | Auerbach et al. | |
| 2005/0228774 A1 | 10/2005 | Ronnewinkel | |
| 2006/0010217 A1 | 1/2006 | Sood | |
| 2006/0031373 A1 | 2/2006 | Werner et al. | |
| 2006/0083357 A1 | 4/2006 | Howell et al. | |
| 2006/0083358 A1 | 4/2006 | Fong et al. | |
| 2006/0242243 A1 | 10/2006 | Matsumoto | |
| 2006/0248151 A1 | 11/2006 | Belakovskiy et al. | |
| 2007/0050384 A1 | 3/2007 | Whang et al. | |
| 2007/0061356 A1 | 3/2007 | Zhang et al. | |
| 2007/0083598 A1 | 4/2007 | Kawakami et al. | |
| 2007/0106729 A1 | 5/2007 | Adams et al. | |
| 2007/0157287 A1 | 7/2007 | Lim | |
| 2008/0059512 A1 | 3/2008 | Roitblat et al. | |
| 2008/0130699 A1 | 6/2008 | Ma et al. | |
| 2008/0243487 A1 | 10/2008 | Dayan et al. | |
| 2010/0250515 A1 | 9/2010 | Ozonat et al. | |

OTHER PUBLICATIONS

Samiei, Maryam; ExMail: Using Information Visualization Techniques to Help Manage Email, School of Engineering Science, Simon Fraser University, 2004.

Wan, Stephen; Generating Overview Summeries of Ongoing Email Discussions, Department of Computing, Macquarine University, 2004.

Wu, Yejun; Indexing emails and email threads for retrieval, College on Information Studies and UMIACS, University of Maryland, 2005.

Office Action for U.S. Appl. No. 11/457,317, mailed Dec. 23, 2008.

Notice of Allowance for U.S. Appl. No. 11/457,317, mailed Jun. 22, 2009.

Office Action for U.S. Appl. No. 11/657,398, mailed Jun. 19, 2009.

Office Action for U.S. Appl. No. 11/657,398, mailed Dec. 7, 2009.

Office Action for U.S. Appl. No. 11/657,398, mailed Jan. 24, 2011.

Notice of Allowance for U.S. Appl. No. 11/657,398, mailed Jul. 20, 2011.

Office Action for U.S. Appl. No. 11/838,738, mailed Aug. 17, 2010.

Notice of Allowance for U.S. Appl. No. 11/838,738, mailed Nov. 30, 2010.

Office Action for U.S. Appl. No. 11/852,444, mailed Jan. 20, 2010.

Office Action for U.S. Appl. No. 11/852,444, mailed Jun. 30, 2010.

Office Action for U.S. Appl. No. 11/852,444, mailed Dec. 9, 2010.

Office Action for U.S. Appl. No. 11/852,444, mailed Jan. 12, 2012.

Notice of Allowance for U.S. Appl. No. 11/852,444, mailed Nov. 30, 2010.

Office Action for U.S. Appl. No. 11/838,747, mailed Sep. 9, 2009.

Notice of Allowance for U.S. Appl. No. 11/838,747, mailed Mar. 10, 2010.

Notice of Allowance for U.S. Appl. No. 11/838,747, mailed Mar. 24, 2010.

Office Action for U.S. Appl. No. 11/457,241, mailed Jan. 12, 2009.

Notice of Allowance for U.S. Appl. No. 11/457,241, mailed Nov. 3, 2009.

Adams, et al. "Trigrams as index element in full text retrieval; observations and experimental results", In Proceedings of the 1993 ACM conference on Computer science (CSC '93), ACM, New York, NY USA, 433-439.

Office Action for U.S. Appl. No. 13/028,841, mailed Mar. 5, 2013.

Office Action for U.S. Appl. No. 13/028,841, mailed Aug. 6, 2013.

* cited by examiner

METHODS AND SYSTEMS FOR AUTOMATICALLY GENERATING SEMANTIC/CONCEPT SEARCHES

CROSS-REFERENCES TO RELATED APPLICATIONS

This application is related to commonly owned U.S. Pat. No. 7,657,603 granted Feb. 2, 2010 based on U.S. patent application Ser. No. 11/457,241, filed Jul. 13, 2006 and entitled "Methods and Systems of Electronic Message Derivation," which is hereby incorporated by reference for all purposes.

This application is related to commonly owned U.S. Pat. No. 7,593,995 granted Sep. 22, 2009 based on U.S. patent application Ser. No. 11/457,317, filed Jul. 13, 2006 and entitled "Methods and Systems of Electronic Message Threading and Ranking," which is hereby incorporated by reference for all purposes.

This application is related to commonly owned and co-pending U.S. patent application Ser. No. 11/657,398, filed Jan. 23, 2007 and entitled "Methods and Systems of Electronic Message Threading and Ranking," which is a continuation of U.S. patent application Ser. No. 11/457,317 and which also claims the benefit of U.S. Provisional Application No. 60/761,501, filed Jan. 23, 2006 and entitled "Incremental E-Mail Crawling and Indexing Methods and Apparatus" and U.S. Provisional Application No. 60/761,679, filed Jan. 23, 2006 and entitled "System, Method, and User Interface for Distributed E-Mail Analysis," which are hereby incorporated by reference for all purposes.

BACKGROUND OF THE INVENTION

This disclosure relates generally to information systems. More particularly, the disclosure relates to techniques for generating a semantic space for electronically stored information.

Collaboration using electronic messaging, such as email and instant messaging is becoming increasingly ubiquitous. Many users and organizations have transitioned to "paperless" offices, where information and documents are communicated almost exclusively using electronic messaging. Also, "paper" based documents can be scanned and converted to electronic files using OCR (Optical character recognition). As a result, users and organizations are also now expending time and money to sort and archive increasing volumes of digital documents and data.

At the same time, state and federal regulators such as the Federal Energy Regulatory Commission (FERC), the Securities and Exchange Commission (SEC), and the Food and Drug Administration (FDA) have become increasingly aggressive in enforcing regulations requiring storage, analysis, and reporting of information based on electronic messages. Additionally, criminal cases and civil litigation frequently employ electronic discovery techniques, in addition to traditional discovery methods, to discover information from electronic documents and messages.

One problem with electronically storing information is that complying with disclosure requirements or reporting requirements is difficult because of the large amounts of data that may accumulate. As broadband connections to the Internet are common in most homes and businesses, emails frequently include one or more multi-megabyte attachments. Moreover, these emails and attachments are increasingly of diverse and propriety formats, making later access to data difficult without the required software.

Another problem is that disclosure requirements or reporting requirements do not simply require that the electronic message be preserved and then disclosed. Often, the disclosure requirements or reporting requirements are more focused toward the disclosure or report on information about the electronic message, such as who had access to sensitive data referred to in the contents of a particular electronic message. Some companies have teams of employees spending days and weeks reviewing emails in order to respond to regulatory audits and investigations. For these reasons, the inventors believe that users and organizations need electronic message analysis solutions to help lower costs in disclosing and/or reporting information related to electronic messaging and other electronically stored information.

In electronic discovery, whether it is for early case assessment or for improving speed and accuracy of review, it is critically important to identify as many responsive documents as is possible. Unlike typical web search engine technologies which focuses on identifying only a handful of most relevant documents, electronic discovery invariably is about minimizing the risks of overlooking relevant documents and minimizing expenses. This shifts the technical challenge from optimizing precision (finding only relevant documents) into one of increasing recall (finding most of the relevant documents).

Accordingly, what is desired is to solve problems relating to generating semantic spaces for electronically stored information, some of which may be discussed herein. Additionally, what is desired is to reduce drawbacks related to semantic analysis and automatic concept searches, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, a semantic space associated with a corpus of electronically stored information (ESI) may be created and used for concept searches. Documents (and any other objects in the ESI, in general) may be represented as vectors in the semantic space. Vectors may correspond to identifiers, such as, for example, indexed terms. The semantic space for a corpus of ESI can be used in information filtering, information retrieval, indexing, and relevancy rankings.

In one embodiment, a method of searching for documents using a semantic space can include receiving a plurality of documents. For each term in a set of terms associated with each document in the plurality of documents, a term vector is generated for the term based on the set of documents which contain that term. For each document that belongs in this set, the document's random signature is weighted by the term frequency (TF) of the term and a global entropy factor. Thereafter, each generated term vector may be stored in association with its corresponding term. A document vector is then generated for each document in the plurality of documents based on a set of term vectors associated with terms that appear in the document. Each generated document vector may be stored in association with its corresponding document. A query term vector is generated for one or more query terms based on term vectors for terms that correspond to the one or more query terms. A query is then generated based on a set of terms whose term vectors satisfy one or more conditions related to the query term vector. The query may be executed to obtain a set of documents in the plurality of documents that are relevant to a concept defined by the one or more query terms.

In one embodiment, generating the term vector for the term may include generating term vectors based on a set of randomly indexed document vectors associated with documents in the plurality of documents in which the term appears. Generating the term vector for the term may include determining frequency of the term in a document and incorporating, into the term vector, a document vector associated with the document scaled based on the determined frequency of the term in the document. In another embodiment, generating the document vector for each document in the plurality of documents may include generating the document vector based on a set of term vectors associated with terms that appear in the document. Generating the document vector may include determining frequency of a term in the document, determining frequency of the term in the plurality of documents, and incorporating, into the document vector, a term vector associated with the term scaled based on the determined frequency of the term in the document and the determined frequency of the term in the plurality of documents.

In some embodiments, an object-ordered index may be generated to facilitate storing each generated term vector in association with its corresponding term or each generated document vector in association with its corresponding document. In further embodiments, a vector-ordered index may be generated to facilitate storing each generated term vector in association with its corresponding term or each generated document vector in association with its corresponding document.

In various embodiments, a set of document clusters may be generated based on the document vectors associated with each document in the plurality of documents. A centroid associated with at least one cluster may be identified as a concept represented by the set of documents. In another embodiment, a term vector may be received associated with a selected term. A set of terms may be determined wherein each term vector of a term in the set of terms satisfies one or more conditions related to the term vector associated with the selected term. Information may be generated indicating that the set of terms are related to the selected term. In another aspect, a set of documents may be determined based on the set of terms wherein a document vector of a document in the set of document satisfies one or more conditions related to term vectors of the set of terms. Information may be generated indicating that the set of documents are related to the selected term.

In a further embodiment, a document vector is received associated with a selected document. A set of document may be determined wherein each document vector of a document in the set of documents satisfies one or more conditions related to the document vector associated with the selected document. Information may be generated indicating that the set of documents are related to the selected document.

In a still further embodiment, a review specification may be received indicative of a review of a subset of documents in the plurality of documents. A determination may be made whether a document vector of a document satisfies one or more conditions related to document vectors associated with document in the subset of documents. The review specification may then be applied to the document when the document vector of the document satisfies the one or more conditions related to document vectors associated with document in the subset of documents.

In further embodiments, a non-transitory computer-readable medium stores computer-executable code for searching for documents using a semantic space. The computer-readable medium may include code for generating, for each term in a set of term associated with each document in the plurality of documents, a term vector for the term based on a set of randomly indexed document vectors associated with documents in the plurality of documents in which the term appears, code for storing each generated term vector in association with its corresponding term, code for generating a document vector for each document in the plurality of documents based on a set of term vectors associated with terms that appear in the document, code for storing each generated document vector in association with its corresponding document, code for generating a query term vector for one or more query terms based on term vectors for terms that correspond to the one or more query terms, code for generating a query based on a set of terms whose term vectors satisfy one or more conditions related to the query term vector, and code for executing the query to obtain a set of documents in the plurality of documents that are relevant to a concept defined by the one or more query terms.

In further embodiments, a computer system may include one or more processors and at least one memory storing processor-executable instructions for searching for documents using a semantic space. The memory may include code for generating, for each term in a set of term associated with each document in the plurality of documents, a term vector for the term based on a set of randomly indexed document vectors associated with documents in the plurality of documents in which the term appears, code for storing each generated term vector in association with its corresponding term, code for generating a document vector for each document in the plurality of documents based on a set of term vectors associated with terms that appear in the document, code for storing each generated document vector in association with its corresponding document, code for generating a query term vector for one or more query terms based on term vectors for terms that correspond to the one or more query terms, code for generating a query based on a set of terms whose term vectors satisfy one or more conditions related to the query term vector, and code for executing the query to obtain a set of documents in the plurality of documents that are relevant to a concept defined by the one or more query terms.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

Embodiments of the present invention generally relate to information systems used in e-discovery and information governance. More particularly, embodiments of the present invention relate to processing of documents and generating a semantic space for the documents.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

Processing of Electronic Messages

Figure 1:
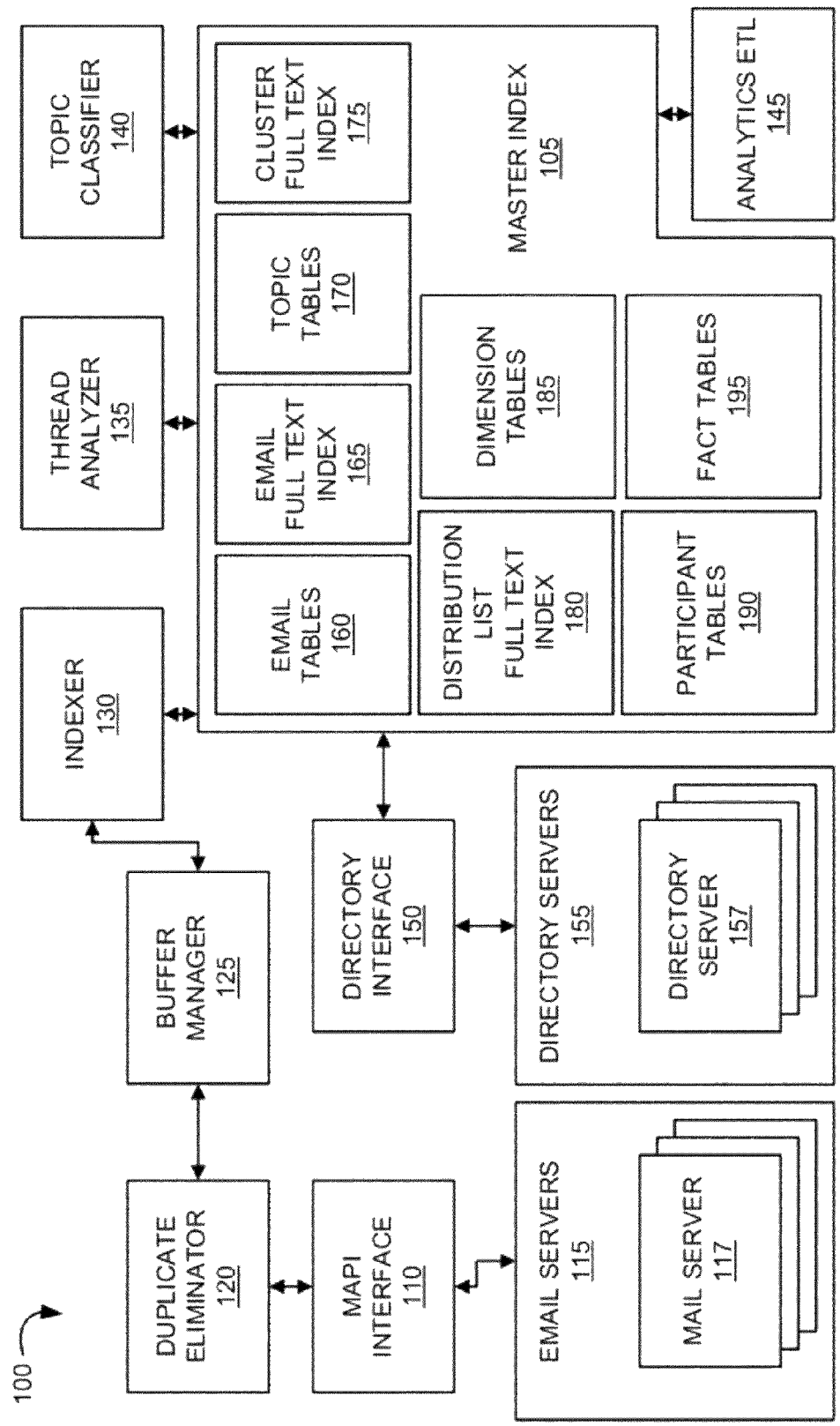
FIG. 1 is a block diagram of an electronic document processing system in one embodiment according to the present invention.

FIG. 1 is a block diagram of an electronic document processing system 100 in one embodiment according to the present invention. In this example, processing system 100 includes master index 105, messaging applications programming interface (MAPI) module 110, e-mail servers 115, duplicate eliminator 120, buffer manager 125, indexer 130, thread analyzer 135, topic classifier 140, analytics extraction, transformation, and loading (ETL) module 145, directory interface 150, and directory servers 155. Master index 105 includes e-mail tables 160, e-mail full text index 165, topic tables 170, cluster full text index 175, distribution list full text index 180, dimension tables 185, participant tables 190, and fact tables 195. E-mail servers 115 include one or more mail servers (e.g., mail server 117). Directory servers 155 include one or more directory servers (e.g., directory server 157).

Master index 105 can include hardware and/or software elements that provide indexing of information associated with electronic documents, such as word processing files, presentation files, databases, e-mail message and attachments, instant messaging (IM) messages, Short Message Service (SMS) messages, Multimedia Message Service (MMS), or the like. Master index 105 may be embodied as one or more flat files, databases, data marts, data warehouses, and other repositories of data. Although the disclosure references specific examples using e-mail messages, the disclosure should not be considered as limited to only e-mail message or electronic messages only. The disclosure is applicable to other types of electronic documents as discussed above.

In various embodiments, master index 105 provides indexes configured for accessing and retrieving a variety of content, metadata, and attributes associated with electronic documents processed by processing system 100. For example, e-mail tables 160 can include hardware and/or software elements that index information associated with e-mail messages processed by processing system 100. E-mail full text index 165 can include hardware and/or software elements that provide a full text index of e-mail messages processed by processing system 100. The full text index may be an inverted index that enables fast searching of contents (e.g., headers and body), metadata, and attachments of e-mail messages processed by processing system 100.

Topic tables 170 can include hardware and/or software elements that index e-mails and topics, concepts, or categories. Topic tables 170 may store relationships between predetermined, user-defined, or automatically derived topics, concepts, or categories and e-mail messages processed by processing system 100. In another aspect, topic table 170 may store relationships between related, similar, and near-duplicate e-mail messages. Cluster full text index 175 can include hardware and/or software elements that provide a full text index of e-mail messages that have a cluster relationship. A cluster relationship may be defined by relationships based on statistical analysis of noun phrases, linguistic analysis, semantic analysis, or the like. Clusters of e-mail messages having close relationships satisfying predetermined criteria may be associated with topics in topic tables 170.

Distribution list full text index 180 can include hardware and/or software elements that provide a full text index of e-mail messages associated with a distribution or conversation, such as mailing list or e-mail chain. Participant tables 190 can include hardware and/or software elements that index information related to participants of a distribution or conversation (e.g., To-recipients, CC-recipients, BCC-recipients, etc.). Dimension tables 185 and fact tables 195 can include hardware and/or software elements that index information facilitating further processing of e-mail messages processed by processing system 100, such as data warehouse processing, post-processing analytics, or the like.

MAPI module 110 is linked to e-mail servers 115 and to duplicate eliminator 120. MAPI module 110 can include hardware and/or software elements configured for communicating with data repositories, such as e-mail servers 115. In this example, MAPI module 110 may interface directly with e-mail server 115 using one or more application programming interfaces (APIs). MAPI module 110 may incorporate or implement other interfaces, protocols, etc. for facilitating communication with a particular data repository. E-mail servers 115 can include hardware and/or software elements that provide electronic messaging services, such as e-mail transport, storage, and retrieval. One example of mail server 117 is a computer system running Microsoft Exchange Server 2000 from Microsoft Corporation of Redmond, Wash. Mail server 117 may include other mail transport agents, mail user agents, and the like. E-mail messages may be stored on mail server 117 in a file, such as an Outlook PST file, a database, or the like.

Duplicate eliminator 120 can include hardware and/or software elements that detect and eliminate redundant and/or duplicative information from data repositories. In one example of operation, MAPI module 110 may retrieve e-mail messages from e-mail servers 115 in order to "crawl" e-mail servers 115 to request e-mail messages. Duplicate eliminator 120 may filter redundant and/or duplicate e-mail messages received from e-mail servers 115.

For example, a user A of mail server 117 may have sent an e-mail message addressed to user B and to user C. When duplicate eliminator 120 received e-mail messages obtained from mailboxes on mail server 117 for users A, B, and C, user A's mailbox contains the e-mail message as sent to user B and user C. Additionally, both user B's and user C's mailbox contains the respective user's copy of the e-mail message as received from user A. Duplicate eliminator potentially receives at least three copies of the e-mail message.

Duplicate eliminator 120 may determine two MD5 checksums for each e-mail message to "identify" the e-mail message. Duplicate eliminator 120 may compute the MD5 checksums in response to message attribute data associated with an e-mail message, such as a sender e-mail address or sender identifier, sorted To-recipient e-mail addresses or To-recipient identifiers, sent time, alpha-numeric contents of subject, and the body text (e.g., body text size, contents of the body text, etc.). Other information not included in the e-mail message but associated with the message attribute data may also be used to compute the MD5 checksums. Other types of integrity, detection, and authenticity algorithms, such as cyclical redundancy checks (CRCs), hashes, and the like, may be used in addition to or in the alternative to the MD5 checksum.

In one example, a first "strict" MD5 checksum can be computed that is unique and represents an exact match of a processed e-mail message. A second "relaxed" MD5 checksum can be computed that is non-unique or semi-unique. Duplicate eliminator 120 may compute a relaxed MD5 checksum using a portion or subset of the message attribute data used to compute the strict MD5 checksum. When duplicate eliminator receives a new e-mail, the new e-mail message may be processed (e.g., address normalization and cleansing) and a strict MD5 checksum may be computed and compared with previously computed strict MD5 checksums to determine whether the new e-mail message is unique. If the strict MD5 checksum for the new e-mail message is different, duplicate eliminator 120 then computes a relaxed MD5 checksum for the new e-mail message and compares the relaxed MD5 checksum to previously computed relaxed MD5 checksums.

If the relaxed MD5 checksum for the new e-mail message is different, then the new-e-mail address is not a duplicate. If the relaxed MD5 checksum for the new e-mail message is the same as one or more previously computed relaxed MD5 checksums, duplicate eliminator 120 may apply one or more rules or policies to further eliminate possible duplicate e-mail messages. The rules or polices may be based on time differences, header processing, and the like, and also the addition of trailing content, such as disclaimers, names of attachment files, and the like.

Buffer manager 125 is linked to duplicate eliminator 120 and indexer 130. Buffer manager 125 can include hardware and/or software elements that manage data communications. Buffer manager 125 may buffer or otherwise manage production and consumption of e-mail messages retrieved while "crawling" data repositories. In one embodiment, buffer manager 125 may create batches of e-mail messages. In one aspect, batching the e-mail messages may allow indexer 130 to apply batch-processing techniques to message attribute data associated with a batch of e-mail messages. Buffer manager 125 may create batches of 10, 50, or 100 e-mail messages.

Indexer 130 is linked to master index 105. Indexer 130 can include hardware and/or software elements that index electronic documents. Indexer 130 may include functionality for decomposing documents into constituent parts and populating master index 105. For example, indexer 130 may process an e-mail message to parse header and body fields to retrieve message content and generate metadata associated with the e-mail message. Indexer 130 may further perform other types of processing, such as surface processing, statistical processing, linguistic processing, semantic processing, or the like.

Advantageously, electronic document processing system 100 can provide a user or organization with access to indexed electronically stored information to assist in reporting requirements or gathering information for the purposes of electronic discovery and information governance. After "crawling" data repositories to retrieve documents and the like, processing system 100 can automatically process and index the retrieved information. Processing system 100 can then allow the user or organization to readily and quickly search and query the processed information for a variety of purposes. Processing system 100 further provides other post-processing features to enhance the discovery and presentation of relevant information to the user or organization.

For example, thread analyzer 135 is linked to master index 105. Thread analyzer 135 can include hardware and/or software elements that organize documents into one or more discussions or conversations. An e-mail thread can be a series or sequence of one or more e-mail messages that form a logical discussion or communication. E-mail messages within an e-mail thread may be related by sender address, recipient address, topic, and time. E-mail messages may further be related based on forwarding replies, CC-recipients, BCC-recipients, and the like. Thread analyzer 135 may determined groups of documents that are related to a discussion or conversation as well as determine orderings or position of e-mail messages in e-mail threads.

In another example, topic classifier 140 is linked to master index 105. Topic classifier 140 can include hardware and/or software elements that determine topics, concepts, or categories for an electronic document. Topic classifier 140 may determine a topic of an e-mail message based on the subject header or in response to the content of the body of an e-mail message. Topic classifier 140 may further determine a topic of an e-mail message based on statistical, linguistic, or semantic analysis. Topic classifier 140 may associate an e-mail message with a given topic, classifier, and/or category. The topic may be predefined, user-defined, or automatically created based on based on statistical, linguistic, or semantic analysis.

In another example, analytics ETL module 145 is linked to master index 105. Analytics ETL module 145 can include hardware and/or software elements that provide an interface accessing master index 105. In one example, analytics ETL module 145 provides an interface for importing and/or extracting data between master index 105 and one or more external data sources. Analytics ETL module 145 may provide an interface for transforming data in master index 105 (e.g., cleansing, aggregation, summarization, integration, etc.) and loading the data into some form of data warehouse for further analysis and processing.

In yet another example, directory interface 150 is linked to master index 105 and directory servers 155. Directory interface 150 can include hardware and/or software elements that access information stored in a directory. A directory can include any database of information associated with objects, such as users or computer hosts. In various embodiments, directory servers 155 include one or more directory servers (e.g., directory server 157) running Active Directory by Microsoft Corporation of Redmond, Wash. In other embodiments, other types of directory servers and/or services may be used such as Lightweight Directory Access Protocol (LDAP) servers, Identity Management servers, and the like. In various embodiments, examples of information stored in directory servers 155 can include "organizational" or "corporate" data, such as department identifiers associated with a user or computer host, a group identifier associated with a user, a corporate or departmental title associated with a user, telephone and address information, and security information.

Figure 2:
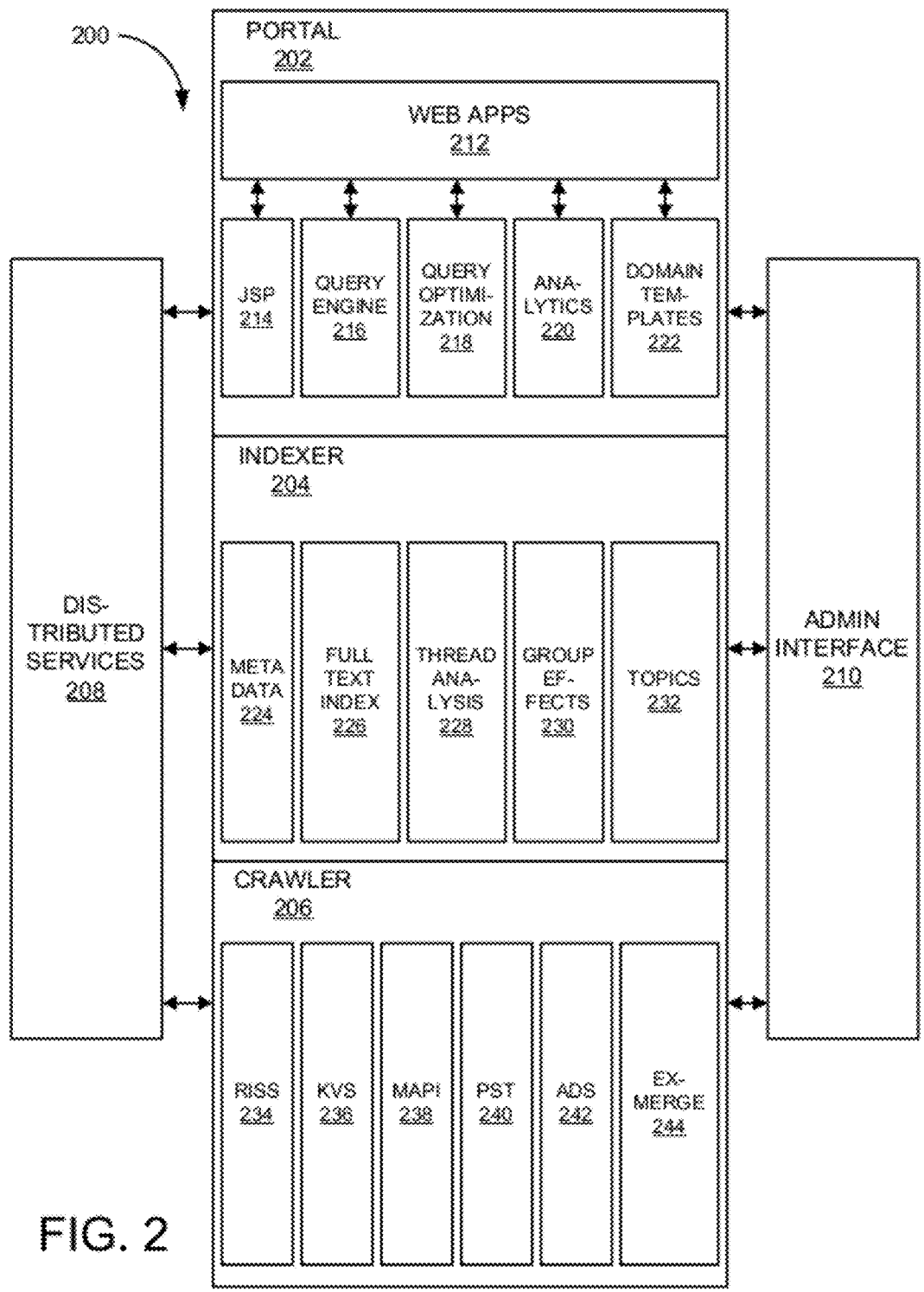
FIG. 2 is a block diagram of software components for processing electronic messages in one embodiment according to the present invention.

FIG. 2 is a block diagram of software components 200 for processing e-mail messages in one embodiment according to the present invention. Software components 200 include portal 202, indexer 204, crawler 206, distributed services 208, and administration interface 210. Portal 202 is linked to the indexer 204, which is linked to the crawler 206. Distributed services 208 and administration interface 210 are linked to each of the portal 202, the indexer 204, and the crawler 206.

Portal 202 includes software elements for accessing and presenting information provided by the indexer 204. In this example, the portal 202 includes web applications 212 communicatively coupled to information gathering and presentation resources, such as a Java Server Page (JSP) module 214, a query engine 216, a query optimization module 218, an analytics module 220, and a domain templates module 222.

Indexer 204 includes software elements for processing and storing e-mail messages. The indexer 204 includes metadata 224, full text indices 226, thread analysis 228, group effects 230, and topics 232.

Crawler 206 includes software elements for retrieving e-mail messages from an e-mail repository. Some examples of an e-mail repository are an e-mail server (e.g., one of the mail servers 117 of FIG. 1), a Post Office Protocol (POP) enabled computer server, an Internet Message Access Protocol (IMAP) enabled computer server, and files, such as PST files, UNIX style maildirs/mbox formats, and the like. In this example, the crawler 206 includes Reference Information Storage System (RISS) module 234, Enterprise Vault Software (EV) module 236, MAPI module 238, PST module 240, Directory Services (ADS) module 242, and a Microsoft Exchange Server Mailbox Merge Wizard (ExMerge) module 244.

Accordingly, software components 200 can provide a user or organization with access to indexed electronically stored information to assist in reporting requirements or gathering information for the purposes of electronic discovery and information governance. After "crawling" electronically stored information to retrieve documents and the like, software components 200 can automatically process and index the retrieved information. Software components 200 can then allow the user or organization to readily and quickly search and query the processed information for a variety of purposes.

Recall of Processed Documents

Early assessment is a growingly important phase of e-discovery and information governance during which complete scope and extent of relevant information in a collection is often unknown. Traditional keyword and Boolean searches often play a big part in an assessment, but they are not always enough to hone in on the specifics of a case. In one aspect, electronic document processing system 100 can offer an additional approach to improve the recall of related and relevant documents based on statistical and linguistic analysis of document content.

In various embodiments, processing system 100 may be used for electronic discovery. Electronic discovery almost always involves searching for relevant and responsive documents. One or more technologies may be applied for the task. Keyword based search has been one traditional method of searching, but its limitations have been well understood and documented [1]. At their most basic level, concept search technologies are designed to overcome some limitations of keyword search.

When applied to document discovery, traditional Boolean keyword search often results in sets of documents that include non-relevant items (false positives) or that exclude relevant terms (false negatives). This is primarily due to the effects of synonymy (different words with similar meanings) or polysemy (same word with multiple meanings). For polysemes, an important characteristic requirement is that they share the same etymology but their usage has evolved it into different meanings. Moreover, there are also situations where words that do not share the same etymology have different meanings (e.g., river bank vs. financial bank), in which case they are classified as homonyms. In addition to the above word forms, unstructured text content, and especially written text in emails and instant messages contain user-created code words, proper name equivalents, contextually defined substitutes, and prepositional references etc., that mask the document from being indentified using Boolean keyword search. Even simple misspellings, typos and OCR scanning errors can make it difficult to locate relevant documents.

Also common is an inherent desire of speakers to use a language that is most suited from the perspective that is convenient for the speaker. This can be illustrated using the event which the victim's side called the event in question an "accident" or a "disaster" while the plaintiff's side called it an "event", "situation", "incident", "problem", "difficulty", etc. The combination of human emotion, language variation, and assumed context makes the challenge of retrieving these documents purely on the basis of Boolean keyword searches a nearly impossible task.

Concept based searching is a very different type of search when compared to Boolean keyword search. The input to concept searching is one or more words that allow the investigator or user to express a concept. The search system is then responsible for identifying other documents that belong to the same concept. All concept searching technologies attempt to retrieve documents that belong to a concept (reduce false negatives and improve recall) while at the same time not retrieve irrelevant documents (reduce false positives and increase precision).

Thus, concept search, as applied to electronic discovery, is a search using meaning or semantics. While it is very intuitive in evoking a human reaction, expressing meaning as input to a system and applying that as a search that retrieves relevant documents is something that requires a formal model. Technologies that attempt to do this formalize both the input request and the model of storing and retrieving potentially relevant documents in a mathematical form. There are several technologies available for such treatment, with two broad initial approaches.

First are unsupervised learning systems. These systems convert input text into a semantic model, typically by employing a mathematical analysis technique over a representation called vector space model. This model captures a statistical signature of a document, its terms and their occurrences. A matrix derived from the corpus is then analyzed using a Matrix decomposition technique. These systems are unsupervised in the sense that they do not require a training set where data is pre-classified into concepts or topics. Also, such systems do not use ontology or any classification hierarchy and rely purely on the statistical patterns of terms in documents.

These systems generally derive their semantics through a representation of co-occurrence of terms. One primary consideration is maintaining this co-occurrence in a form that reduces impact of noise terms while capturing the essential elements of a document. For example, a document about an automobile launch may contain terms about automobiles, their marketing activity, public relations etc., but may have a few terms related to the month, location and attendees, along with frequently occurring terms such as pronouns and prepositions. Such terms do not define the concept automobile, so their impact in the definition must be reduced. To achieve such end result, unsupervised learning systems represent the matrix of document-terms and perform a mathematical transformation called dimensionality reduction.

First are supervised learning systems. In the supervised learning model, an entirely different approach is taken. A main requirement in this model is supplying a previously established collection of documents that constitutes a training set. The training set contains several examples of documents belonging to specific concepts. The learning algorithm analyzes these documents and builds a model, which can then be applied to other documents to see if they belong to one of the several concepts that is present in the original training set. Thus, concept searching task becomes a concept learning task that may use one of the following techniques: Decision Trees, Naïve Bayesian Classifier, and Support Vector Machines.

While supervised learning is an effective approach during document review, its usage in the context of searching has significant limitations. In many situations, a training set that covers all possible outcomes is unavailable and it is difficult to locate exemplar documents. Also, when the number of outcomes is very large and unknown, such methods are known to produce poor results.

As noted earlier, concept searching techniques are most applicable when they can reveal semantic meanings of a corpus without a supervised learning phase. One method includes Singular Value Decomposition (SVD) also is known with Latent Semantic Indexing (LSI). LSI is one of the most well-known approaches to semantic evaluation of documents. This was first advanced at Bell Labs (1985) and later developed by many information retrieval researchers [3]. The essence of the approach is to build a complete term-document matrix, which captures all the documents and the words present in each document. Typical representation is to build an N×M matrix where the N rows are the documents, and M columns are the terms in the corpus. Each cell in this matrix represents the frequency of occurrence of the term at the "column" in the document "row".

Such a matrix is often very large—document collections in the millions and terms reaching tens of millions are not uncommon. Once such a matrix is built, the mathematical technique known as SVD reduces the dimensionality of the matrix into a smaller size. This process reduces the size of the matrix and captures the essence of each document by the most important terms that co-occur in a document. In the process, the dimensionally reduced space represents the "concepts" that reflect the conceptual contexts in which the terms appear.

Another method includes Principal Component Analysis (PCA) which is very similar to latent semantic analysis in that a set of highly correlated artifacts of words and documents in which they appear is translated into a combination of the smallest set of uncorrelated factors. These factors are the principal items of interest in defining the documents, and are determined using a SVD technique. The mathematical treatment, application and results are similar to LSI. A variation on this, called Independent Component Analysis (ICA) is a technique that works well with data of limited variability. However, in the context of electronic discovery documents where data varies widely, this results in poor performance.

Yet another method includes Non-negative Matrix Factorization (NMF) which is most useful for classification and text clustering where a large collection of documents are forced into a small set of clusters. NMF constructs a document-term matrix similar to LSI and includes the word frequency of each term. This is factored into a term-feature and feature-document matrix, with the features automatically derived from the document collection. The process also constructs data clusters of related documents as part of the mathematical reduction. An example of this research takes the Enron email corpus and classifies the data using NMF into 50 clusters [2].

Latent Dirichlet Allocation (LDA) is a technique that combines elements of Bayesian learning and probabilistic latent semantic indexing. In this sense, it relies on a subset of documents pre-classified into a training set, and unclassified documents are classified into concepts based on a combination of models from the training set [10].

Although theoretically attractive and experimentally successful, word space models are plagued with efficiency and scalability problems. This is especially true when the models are faced with real-world applications and large scale data sets. The source of these problems is the high dimensionality of the context vectors, which is a direct function of the size of the data. If document-based co-occurrences is used, the dimensionality equals the number of documents in the collection. If word-based co-occurrences is used, the dimensionality equals the vocabulary, which tends to be even bigger than the number of documents. This means that the co-occurrence matrix will soon become computationally intractable when the vocabulary and the document collections grow.

Nearly all the technologies build a word space by building a word-document matrix with each row representing a document and column representing a word. Each cell in such a matrix represents the frequency of occurrence of the word in that document. All these technologies suffer from a memory space challenge, as these matrices grow to very large sizes. Although many cells are sparse, the initial matrix is so large that it is not possible to accommodate the computational needs of large electronic discovery collections. Any attempt to reduce this size to a manageable size is likely to inadvertently drop potentially responsive documents. Another problem with all of these methods is that they require the entire semantic space to be constructed ahead of time, and are unable to accommodate new data that would be brought in for analysis. In most electronic discovery projects, it is routine that some part of the data is brought in as a first loading batch, and once review is started, additional batches are processed.

In various embodiments, a semantic space is generated using a variation of Reflective Random Indexing (RRI) [4, 5, 6]. In one aspect, a semantic vector space model is provided to achieve the same dimensionality reduction espoused by LSI, without requiring the mathematically complex and intensive SVD and related matrix methods. In some embodiment, a set of term vectors and a set of document vectors are created. These vectors may be built using a scan of the document and term space with several data normalization steps. A semantic space build may occur seamlessly without any user intervention, such as during indexing or analytics processing as discussed above. Case data collection may then ready for culling, early case assessment (ECA), search, review, production, or the like.

Generation of a Semantic Space

In various embodiments, processing system 100 generates a semantic space with semantic vectors as term vectors and document vectors. Processing system 100 may generate a term vector for each term in a corpus of information. Processing system 100 then may generate a document vector for each document in the corpus. As noted earlier, one primary characteristic of the semantic space is a dimensionality reduction of a term-document matrix. Each row in a term-document matrix represents all documents in which a term appears. Each column in the matrix represents all terms that a document contains. Therefore, semantic relatedness may be expressed in the connectedness of each matrix cell. For example, two documents that share the same set of terms may be connected through a direct connection. It is also possible for two documents to be connected using an indirect reference.

Figure 3:
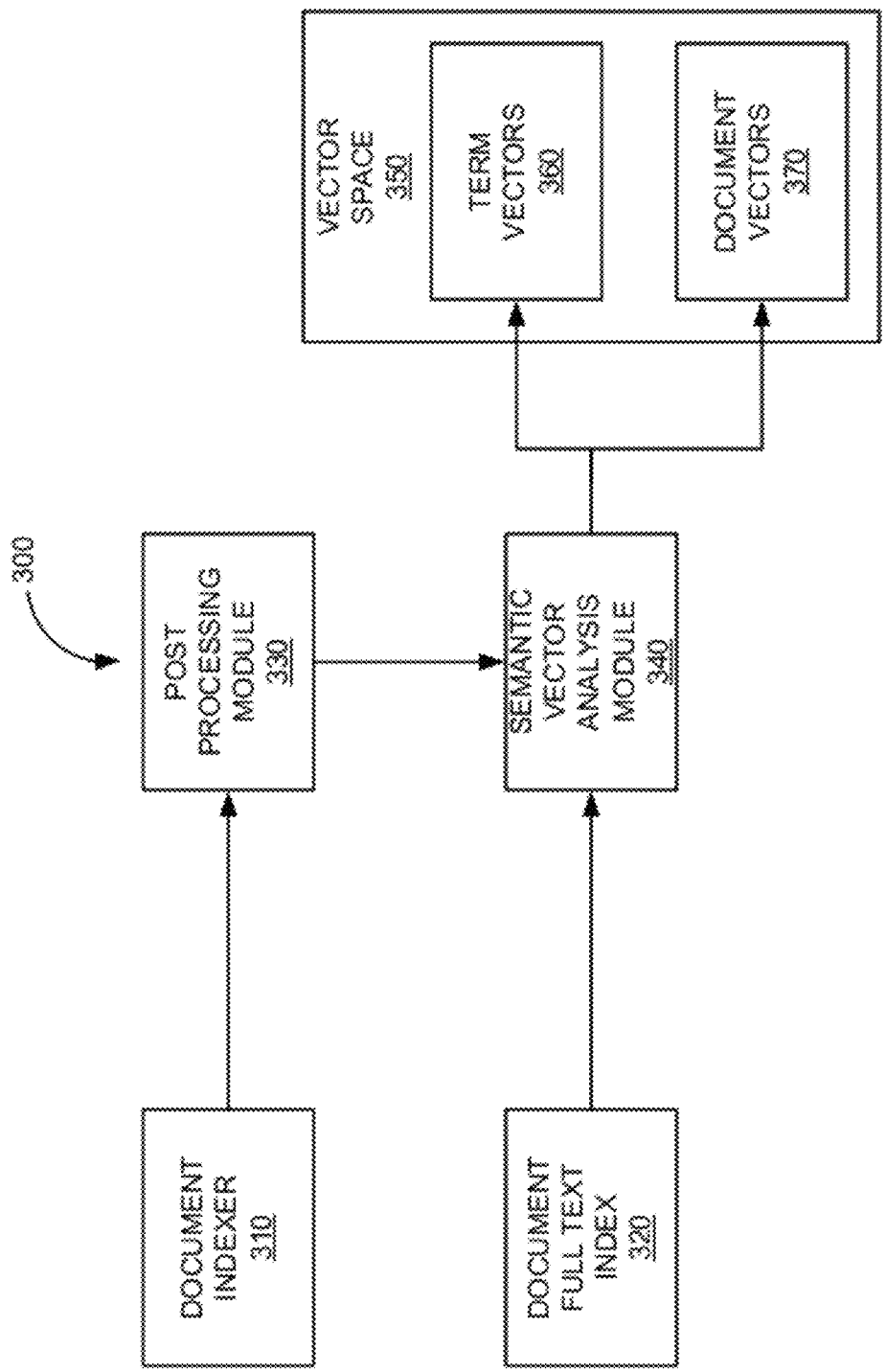
FIG. 3 is a block diagram illustrating an exemplary processing flow of electronic documents for generating a semantic space in one embodiment according to the present invention.

FIG. 3 is a block diagram illustrating exemplary processing flow 300 of electronic documents for generating a semantic space in one embodiment according to the present invention. In this example, document indexer 310 includes hardware and/or software elements configured for indexing documents. Document indexer 310 may index documents in a corpus of information to generate one or more indexes. Some examples of indexes that may be generated by document indexer 310 can include Lucene Indexes and those discussed above with respect to FIG. 1. In one embodiment, document indexer 310 first indexes text associated with documents in a corpus into document full text index 320. Document indexer 310 may further provide all indexed terms to post processing module 330 and semantic vector analysis module 340 for building a semantic space.

Semantic vector analysis module 340 includes hardware and/or software elements configured for generating semantic space 350. For example, semantic vector analysis module 340 may identify terms found in each document of a corpus and all the documents in which a term is found. Semantic vector analysis module 340 then may build both term-to-term (e.g., term vectors 360) and term-to-document (e.g., document vectors 370) vector projections in semantic space 350. For example, semantic vector analysis module 340 may examine subject, body, quoted text regions of email messages indexed in document full text index 320 and content regions of the email messages indexed in document full text index 320.

Table 1 below illustrates a term document matrix for fifteen terms and six documents that may be generated by semantic vector analysis module 340. There are several terms related to another through a direct connection—"investments" and "manhattan" for example, through the term "diamond". Indirect connections are further evident between terms such as "poker" and "investments."

TABLE 1

|  | d1 | d2 | d3 | d4 | d5 | d6 |
|---|---|---|---|---|---|---|
| diamond | 1 | 1 |  | 1 |  | 1 |
| investments | 1 |  |  |  |  |  |
| fund |  |  | 1 |  |  |  |
| apple |  |  | 1 |  |  |  |
| hedge |  |  | 1 |  |  |  |
| manhattan |  | 1 |  |  |  |  |
| poker |  |  |  | 1 | 1 |  |
| hand |  |  |  |  | 1 |  |
| ace |  |  |  |  | 1 |  |
| baseball |  |  |  |  |  | 1 |
| yankees |  |  |  |  |  | 1 |
| office |  | 1 |  |  |  |  |
| stock |  |  | 1 |  |  |  |
| table |  |  |  |  | 1 |  |

As can be observed, the above term-document matrix is a very sparse matrix. This can grow to very large sizes for most document analysis cases. In various embodiments, dimensionality reduction can be applied to reduce the sparse matrix into a manageable size. This achieves two purposes. First, it enables large cases to be processed in currently available computing platforms. Second, and more importantly, it captures the semantic relatedness in a mathematical model.

To further improve the quality of semantic vectors, semantic vector analysis module 340 may apply certain filters. In one example, semantic vector analysis module 340 may apply one or more rules to remove terms with low Inverse Document Frequency (IDF). Terms with a low IDF may include terms that are very common among a large number of documents which may not be very helpful in describing the semantic content of documents. In another example, semantic vector analysis module 340 may apply one or more rules to remove terms with very low global term frequency (TF). Terms less than a small number of global TF also may not help, since they are limited to just a few documents. In a still further example, semantic vector analysis module 340 may apply one or more rules to remove terms with language specific characters or unusual characters as these also may not be effective in defining a concept.

In various embodiments, in building semantic spaces, semantic vector analysis module 340 may retain original terms without any stemming applied. In one aspect, by not requiring stemming, performance of building these vector spaces may be helped in that the process is not impacted by language identification and language stemming performance. In further embodiments, document full text index 320 may include a variety of partitions. Semantic vector analysis module 340 may process each partition independently and/or separately. One positive outcome of per-partition vector space is that the semantic vector building phase scales linearly by the number of partitions in the index. One negative outcome is that search results need to be merged, and clustering of documents may produce multiple clusters, one for each partition. An alternative design would be to build a single vector space for all terms and documents put together.

Figure 4:
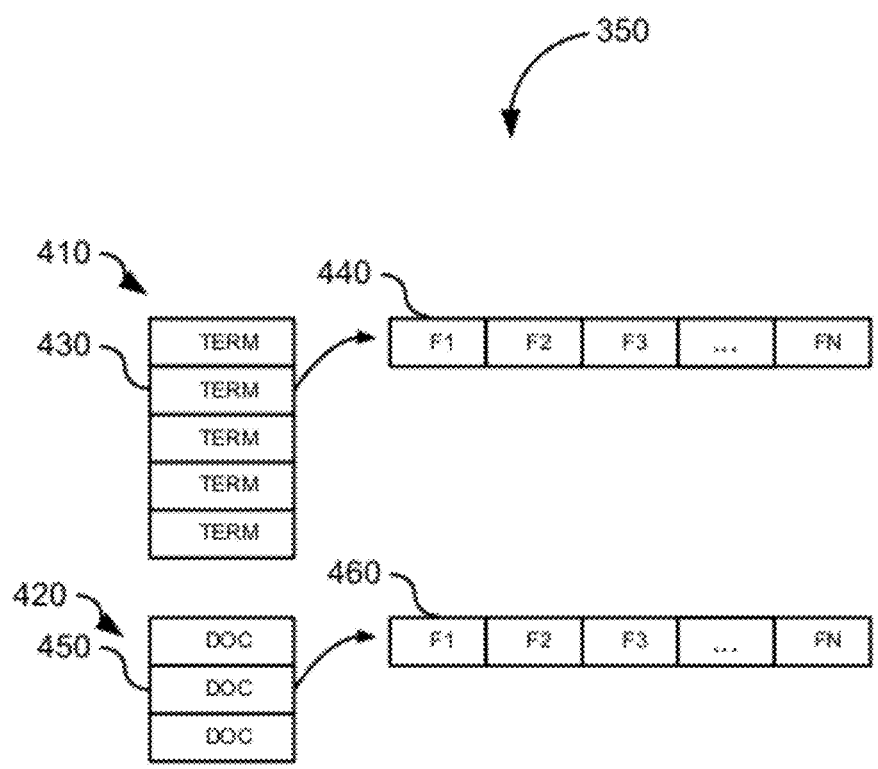
FIG. 4 is a block diagram illustrating an exemplary implementation of term vectors and document vectors of a semantic space in one embodiment according to the present invention.

FIG. 4 is a block diagram illustrating an exemplary implementation of term vectors and document vectors of semantic space 350 of FIG. 3 in one embodiment according to the present invention. In this example, semantic space 350 includes set 410 of term vectors and set 420 of document vectors. In various embodiments, set 410 of term vectors and set 420 of document vectors associated with semantic space 350 may be represented as a sequence or series of floating points. For example, term vector 430 may include set 440 of floating point values (e.g., F1, F2, F3, . . . , FN). Document vector 450 may include set 460 of floating point values. One or more algorithms may be used to assign vectors of a certain dimension to each document in a corpus. In some embodiments, the size of a document vector (e.g., the number of float values) may be configurable. In one aspect, the matrix size may be limited to (N*M*k) where N is the number of terms, M is the number of documents and k is the number of dimensions. In other embodiments, there may be very few non-zero terms in these matrices, because a random initialization may populate all the cells of a term or document vector. This dense packing, and the fact that each cell is a float, may contribute to capturing the semantic essence of the population as a semantic space.

Figures 5A, 5B:
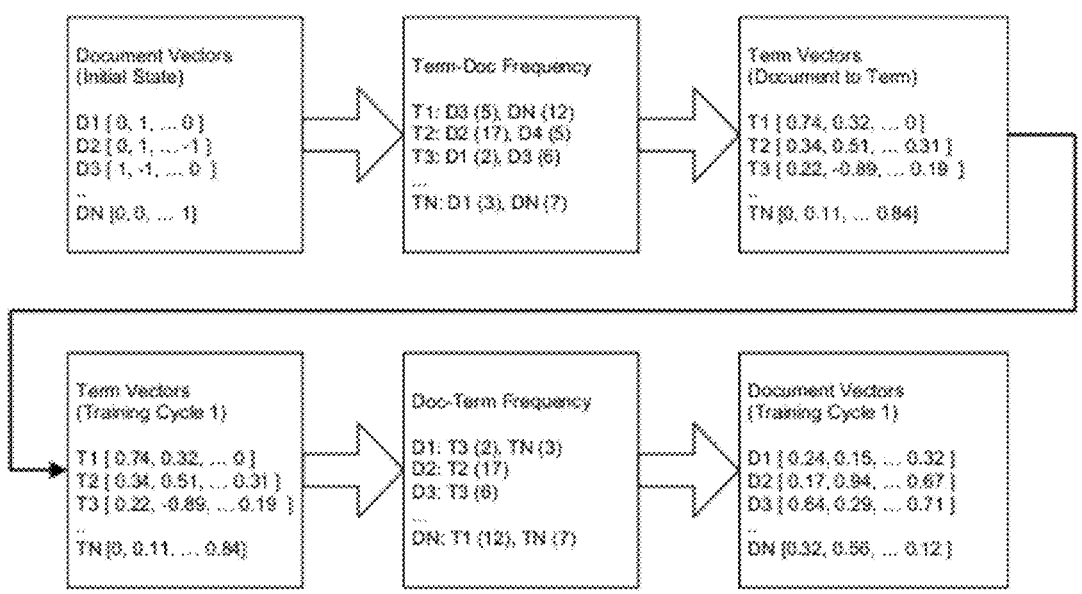
FIG. 5A is a block diagram illustrating document vectors of a semantic space as initialized using a variation of Reflective Random Indexing in one embodiment according to the present invention.
FIG. 5B is a block diagram illustrating a single training cycle for a semantic space in one embodiment according to the present invention.

In further embodiments, vector assignments may initially be chosen essentially at random. FIG. 5A is a block diagram illustrating randomly generated document vectors of semantic space 350 according to Table 1 in one embodiment according to the present invention. One or more vectors may be derived from a random starting point. The vectors may then be refined through training cycles or through other incremental processing. FIG. 5A is a block diagram illustrating document vectors of a semantic space as initialized using a variation of Reflective Random Indexing in one embodiment according to the present invention. In this example, a document vector for each document in a corpus of information may be assigned a series of sequence of random values (i.e., a document vector is assigned a random collection of 200 float values). Specific randomly chosen numbers may be at assigned at each position. In some aspect, the actual numbers assigned are not important as is selecting a unique or semi-unique random pattern for each document.

In some embodiment, after initializing each document vector of a document in a corpus to random values, each document vector represents an initial signature of the document. Term vectors can then be computed by iterating through all the terms of the documents in the corpus. For each term of a given document, processing system 100 can examine all documents in which the term appears. As an example, the word "diamond" appears in Table 1 in documents d1, d2, d4, and d6. Each corresponding document vector then can be merged into a term vector for the word "diamond." In one aspect, the merging of the document vectors uses the initially determined random values of the document vector corresponding to a term and scales the values by the frequency of the term in each document as in equation (1):

$$t_{i,j} = \sum_{k=0}^{l} n_k d_{k,j} \quad (1)$$

Each term k's frequency in the document $n_k$ weighs in for each document vector's position. Thus, this operation projects all the documents that a term appears in, and condenses it into the dimensions allocated for that term. As is evident, this operation is a fast scan of all terms and their document positions. Using various indexing schemes (e.g., Lucene API TermEnum and TermDocs), a collection of term vectors can be derived very easily.

Once term vectors are computed, these term vectors can be projected on to document vectors. For example, processing system 100 may then compute new document vectors from the term vectors, replacing the former random assignments with a new vector. For example, processing system 100 computes a new document vector for each document by examining all the terms of the document and merging all the term vectors into a new document vector (e.g., using a vector sum). The merging of term vectors may take into account the frequency of each term in the document and the frequency of the document in the entire corpus.

In some embodiments, the above process constitutes a single training cycle. Processing system 100 may repeat the process for a second cycle allowing the vectors to converge to a more stable point. Specifically, term vectors can again be computed by iterating through all the terms of the document. For each term of a given document, processing system 100 can examine all documents in which the term appears. Each corresponding document vectors then can be merged into the term vector. In this aspect, the merging of the document vectors uses term vectors determined in each previous training cycle.

Figure 6:
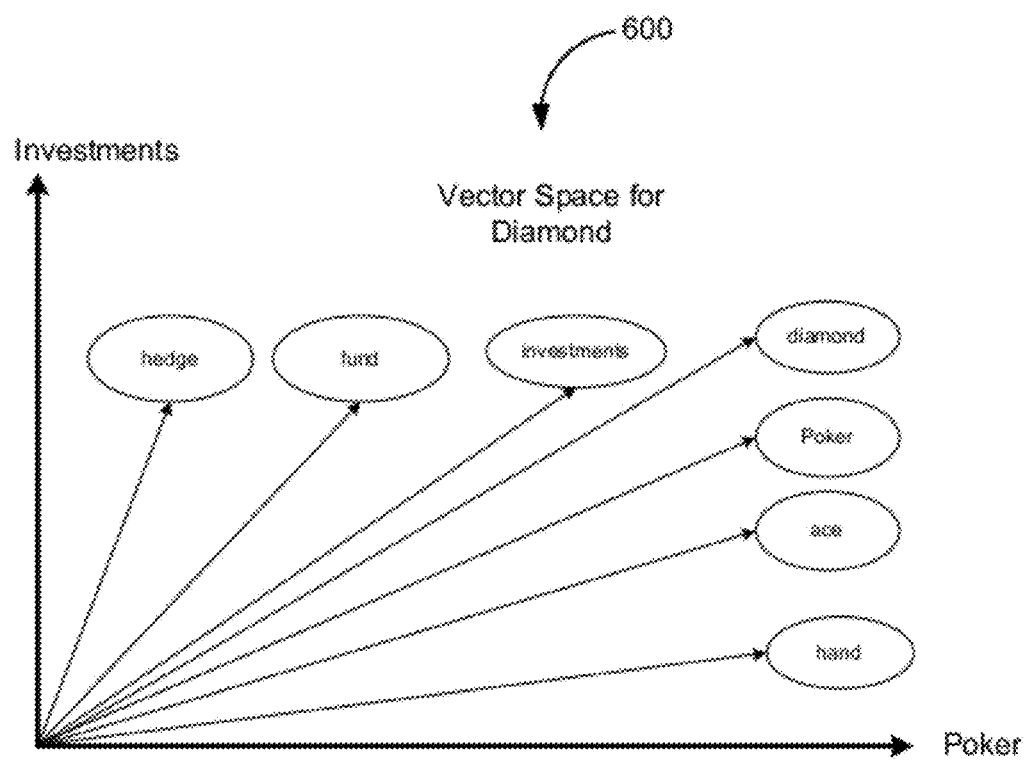
FIG. 6 is a graph illustrating a semantic space generated according to one embodiment of the present invention.

Accordingly, by constructing a semantic vector space for a corpus of documents, processing system 100 can generate an output space that captures most if not all essential co-occurrence patterns embodied in the corpus. Thus, each term vector maintains most if not all of the documents in which a corresponding term appears and each document vector maintains most if not all of the terms present in a corresponding document. Together, a co-occurrence matrix derives the semantic position of the documents in the corpus. FIG. 6 is graph 600 illustrating semantic space 350 generated according to Table 1 in one embodiment of the present invention.

Figure 7A:
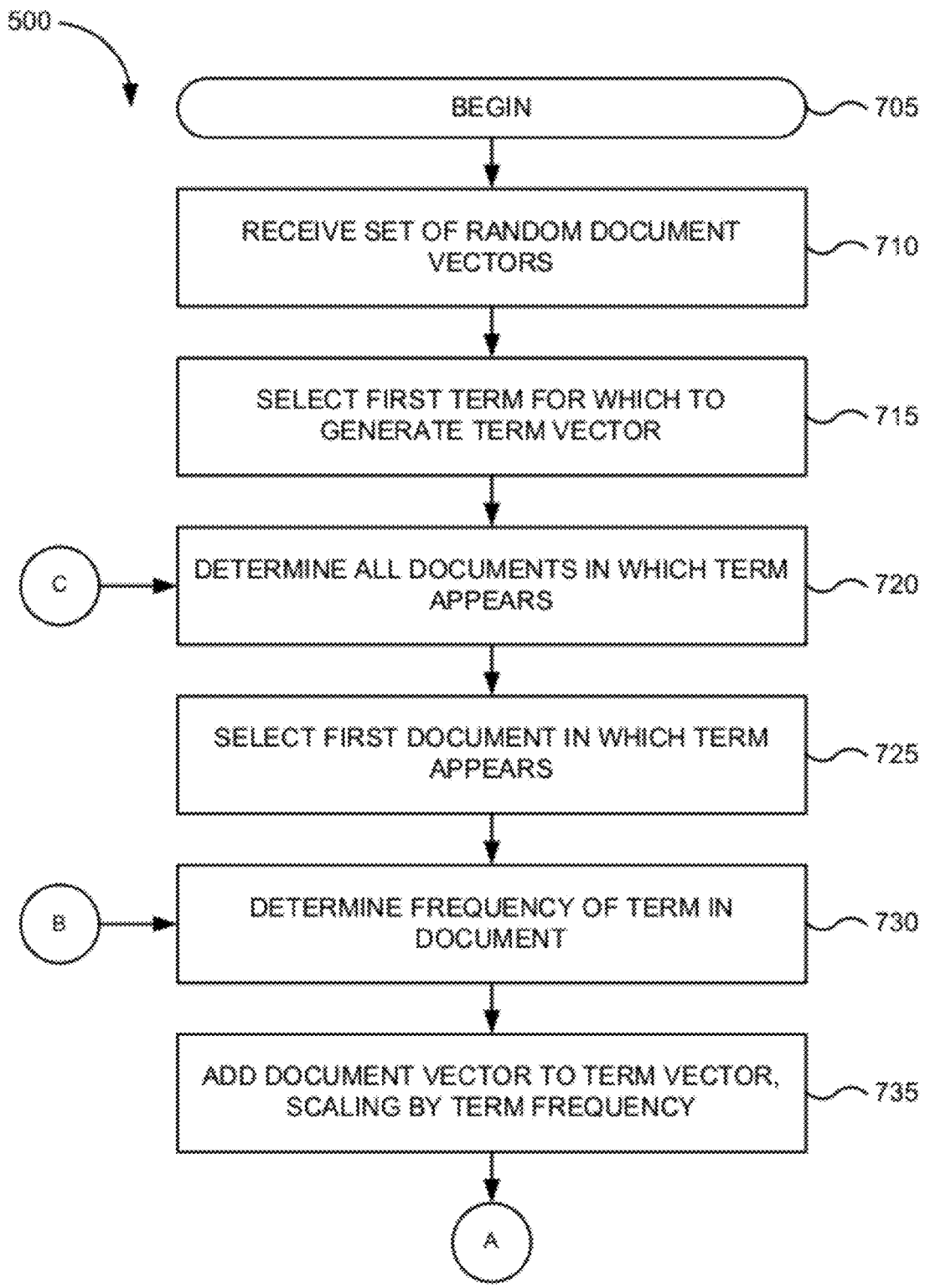
FIGS. 7A and 7B are a flowchart of a method for generating term vectors of a semantic space in one embodiment according to the present invention.
Figure 7B:
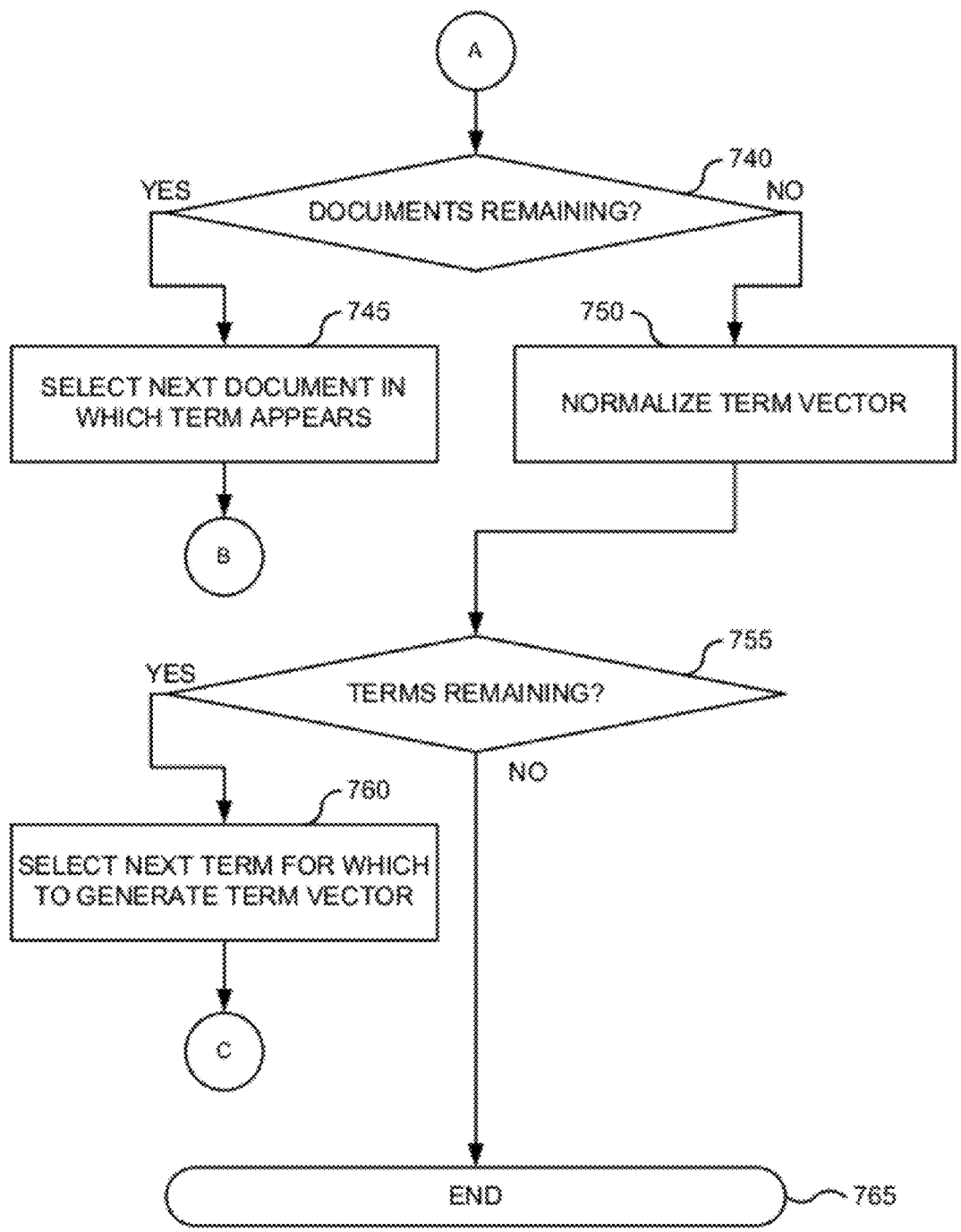

FIGS. 7A and 7B are a flowchart of method 700 for generating term vectors of a semantic space in one embodiment according to the present invention. Implementations of or processing in method 700 depicted in FIGS. 7A and 7B may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 700 depicted in FIGS. 7A and 7B begins in step 705 of FIG. 7A.

In step 710, a set of random document vectors are received. As discussed above, in various embodiments, a set of random document vectors may be generated with each document of a corpus using Random Indexing. The general idea behind word space models is to use distributional statistics to generate high-dimensional vector spaces, in which words are represented by context vectors whose relative directions are assumed to indicate semantic similarity. This assumption is motivated by the distributional hypothesis, which states that words with similar meanings tend to occur in similar contexts. According to this hypothesis, if two words are observed that constantly occur with the same contexts, it may be assuming that the two words mean similar things. The two words not need to occur with each other; only that the words co-occur with the same other words. In standard word space methodology, a high-dimensional vector space is produced by collecting the data in a co-occurrence matrix F, such that each row Fw represents a unique word w and each column Fc represents a context c, typically a multi-word segment such as a document, or another word. In the former case, where the columns represents documents, the matrix may be a words-by-documents matrix. In the latter case where the columns represents words, the matrix may be called a words-by-words matrix. LSA is an example of a word space model that uses document-based co-occurrences.

The cells Fwc of a co-occurrence matrix record the frequency of co-occurrence of word w and document or word c. As an example, for document-based co-occurrences, and if a given word is observed three times in a given document in a corpus, a 3 may be entered in a corresponding cell in the co-occurrence matrix. By the same token, for word-based co-occurrences, and if two given words are observed to occur close to each other five times in a corpus, a 7 may be entered in a corresponding cell of the co-occurrence matrix. Frequency counts are usually normalized and weighted in order to reduce the effects of high frequency words, and, in case document-based co-occurrences are used, to compensate for differences in document size.

The point of the co-occurrence matrix is that the rows Fw effectively constitute vectors in a high-dimensional space, such that the elements of the vectors are (normalized) frequency counts, and the dimensionality of the space is determined by the number of columns in the matrix, which is identical to the number of contexts (i.e. words or documents) in a corpus. We call the vectors context or document vectors, since they represent the contexts or documents in which words have occurred. In effect, the context or document vectors are representations of the distributional profiles of words, which means that a distributional similarity may be defined between words in terms of vector similarity. By virtue of the distributional hypothesis, this makes it very straight-forward to compute semantic similarity between words, such that a comparison is made between context vectors using any of a wide range of possible vector similarity measures, such as the cosine of the angles between the vectors, or the City-Block metric.

Although theoretically attractive and experimentally successful, word space models are plagued with efficiency and scalability problems. This is especially true when the models are faced with real-world applications and largescale data sets. One source of these problems is the high dimensionality of context or document vectors, which is a direct function of the size of the data. For document-based co-occurrences, the dimensionality equals the number of documents in the collection, and for word-based co-occurrences, the dimensionality equals the vocabulary, which tends to be even bigger than the number of documents. This means that the co-occurrence matrix will soon become computationally intractable when the vocabulary and the document collection grow. Another problem with the co-occurrence matrix is that a majority of the cells in the matrix will be zero due to the sparse data problem. That is, only a fraction of the co-occurrence events that are possible in the co-occurrence matrix will actually occur, regardless of the size of the data. A tiny amount of the words in language are distributionally promiscuous; the vast majority of words only occur in a very limited set of contexts. In a typical co-occurrence matrix, more than 99% of the entries are zero.

In order to counter problems with very high dimensionality and data sparseness, most well-known and successful models, like LSA, use statistical dimension reduction techniques. Standard LSA uses truncated Singular Value Decomposition (SVD), which is a matrix factorization technique that can be used to decompose and approximate a matrix, so that the resulting matrix has much fewer columns—typically only a couple of hundred—and is much denser. It should be noted that SVD is not the only way to achieve this result. There are a number of related dimension reduction techniques that are used in word space research (e.g. principal component analysis and independent component analysis), and they all share the same basic methodology: first sample the data in a standard co-occurrence matrix, and then transform it into a much smaller and denser representation.

There are (at least) three reasons to avoid using dimension reduction techniques of this type:

Dimension reduction techniques such as SVD tend to be computationally very costly, with regards to both memory consumption and execution time. For many applications, and especially for large vocabularies and large document collections, it is not practically feasible to compute an SVD.

Dimension reduction is typically a one-time operation, which means that the entire process of first constructing the co-occurrence matrix and then transforming it has to be done from scratch, every time new data is encountered. The inability to add new data to the model is a serious deficiency, as many applications require the possibility to easily update the model.

Most importantly, these dimension reduction techniques fail to avoid the initial huge co-occurrence matrix. On the contrary, they require initial sampling of the entire data. There are two problems with this. First, it is the initial co-occurrence matrix that is computationally cumbersome. In order to make the models efficient and scalable, this step should be avoided, rather than handled by ad hoc solutions. Second, initial sampling of the entire data means that there can be no intermediary results. It is only after both constructing and transforming the co-occurrence matrix that any processing can begin.

As an alternative to LSA-like models that first construct a huge co-occurrence matrix and then use a separate dimension reduction phase, processing system 100 may use an incremental word space model called Random Indexing, based on Pentti Kanerva's work on sparse distributed representations. The basic idea is to accumulate context vectors based on the occurrence of words in contexts. This technique can be used with any type of linguistic context, is inherently incremental, and does not require a separate dimension reduction phase.

In some embodiments, a Random Indexing technique can be described as a two-step operation:

First, each context (e.g. each document or each word) in a corpus of information is assigned a unique and randomly generated representation called an index vector. These index vectors are sparse, high-dimensional, and ternary, which means that their dimensionality (d) is on the order of thousands, and that they consist of a small number of randomly distributed +1s and −1s, with the rest of the elements of the vectors set to 0.

Then, context vectors are produced by scanning through the text, and each time a word occurs in a context (e.g. in a document, or within a sliding context window), that context's d-dimensional index vector is added to the context vector for the word in question. Words are thus represented by d-dimensional context vectors that are effectively the sum of the words' contexts.

In the Random Indexing approach, a standard co-occurrence matrix F of order w X c is produced by using unary index vectors of the same dimensionality c as the number of contexts, and then the resulting context vectors are collected in a matrix. Such unary index vectors would consist of a single 1 in a different position for each context, and would thus be orthogonal. By contrast, the d-dimensional random index vectors are only nearly orthogonal.

In step 715, a first term for which to generate a term vector is selected. In step 720, all documents in which the term appears are determined. All documents in which a term appears may be obtained using one or more indexes as discussed above. In step 725, a first document in which the term appears is selected.

In step 730, frequency of the term in the document is determined. In step 735, a document vector of the selected document is added to a term vector for the selected term. The document vector may be scaled by the term frequency.

FIG. 7A continues in FIG. 7B, where in step 740, a determination is made whether any documents remain in which the term appears. If one or more documents remain in which the term appears, in step 745, the next document in which the term appears is selected. Processing is then repeated for the next document in step 730 of FIG. 7A. If no documents remain in which the term appear, in step 750, the term vector is normalized. Each term vector may be normalized so the vector is of length 1.0.

In step 755, a determination is made whether any terms remain for which to generate a term vector. If one or more terms remain, in step 760, the next term is selected. Processing is then repeated for the next term in step 720 of FIG. 7A. If no terms remain for which to generate a term vector, FIG. 7B ends in step 765.

Figure 8A:
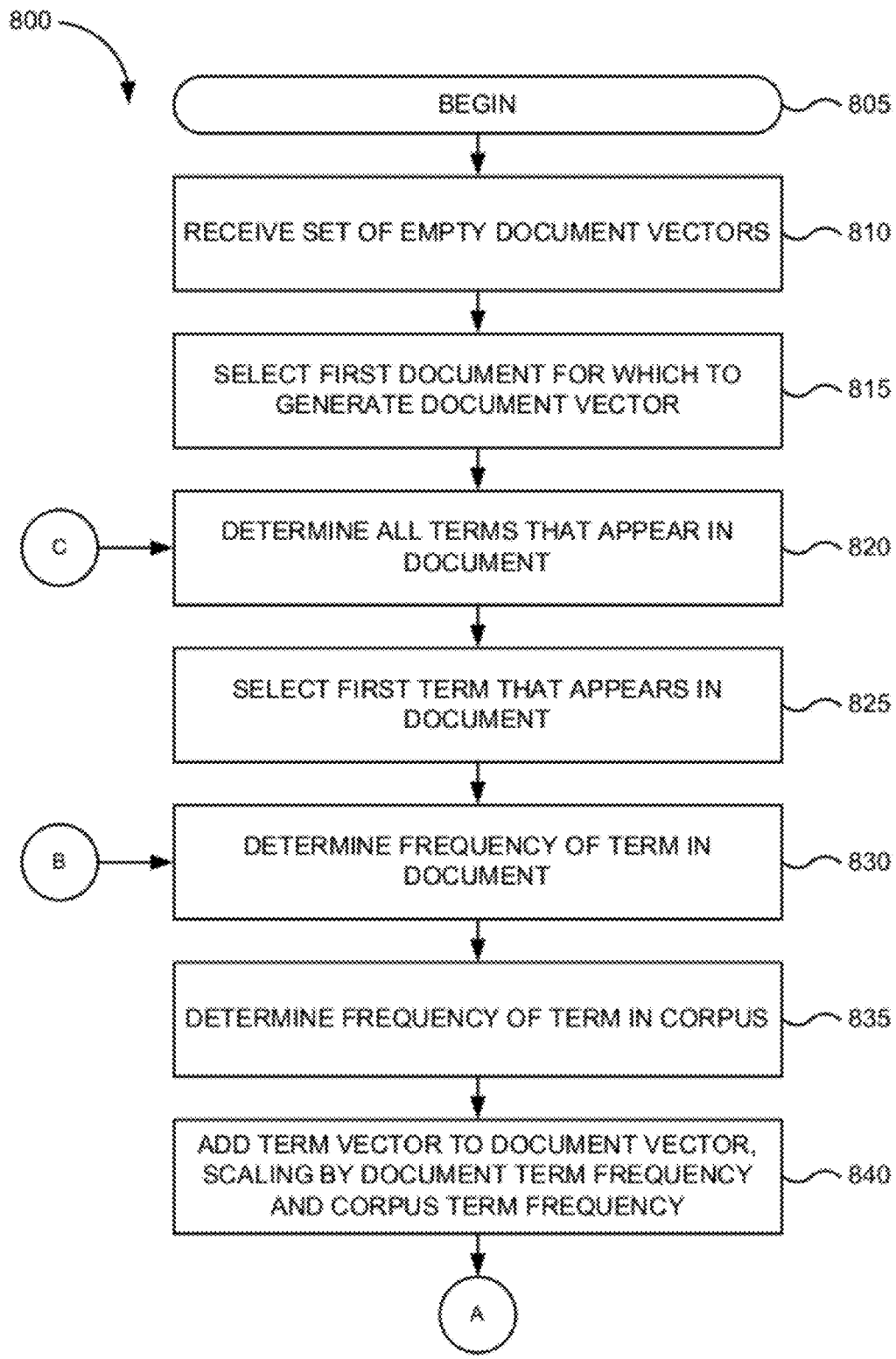
FIGS. 8A and 8B are a flowchart of a method for generating document vectors of a semantic space in one embodiment according to the present invention.
Figure 8B:
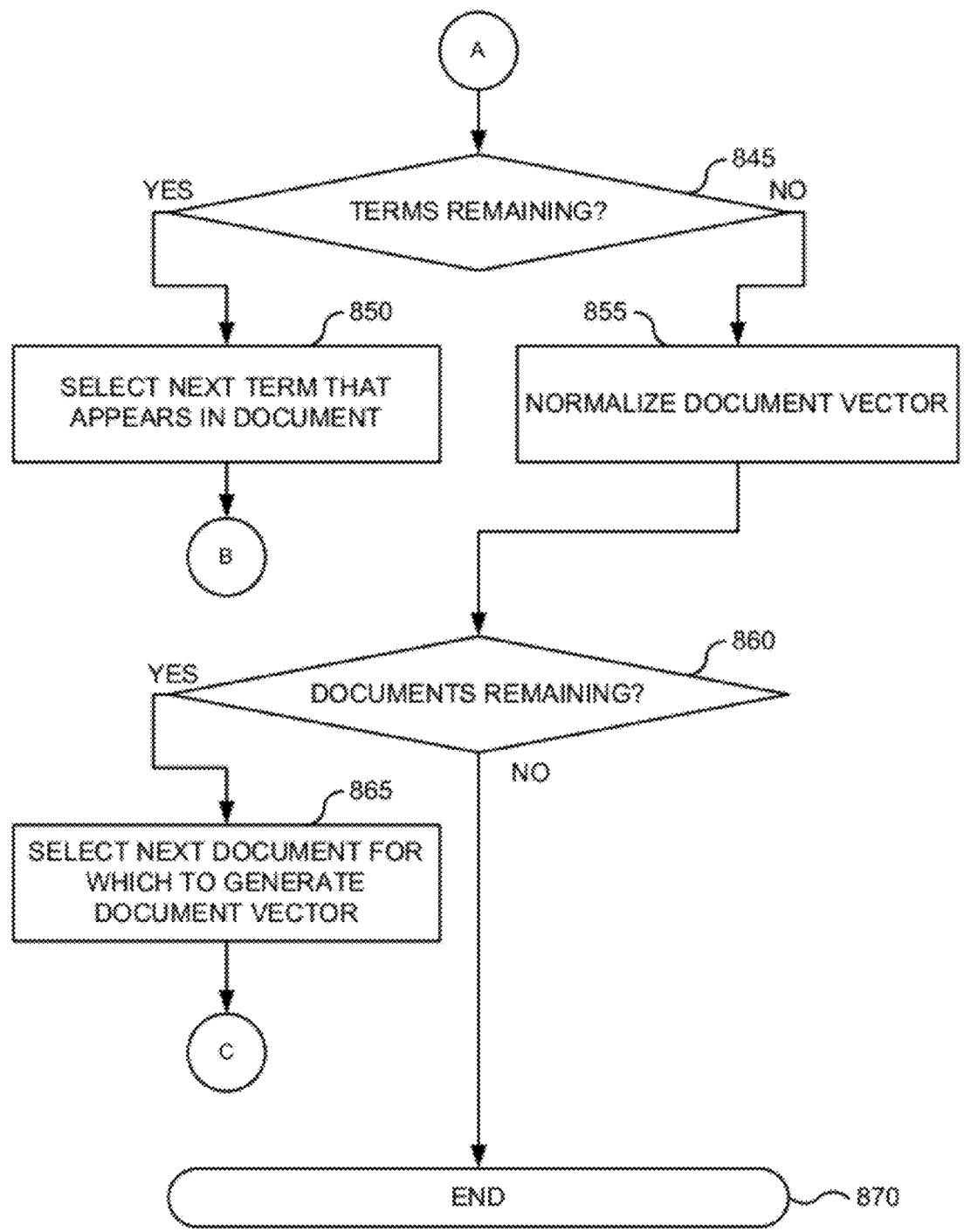

FIGS. 8A and 8B are a flowchart of method 800 for generating document vectors of a semantic space in one embodiment according to the present invention. Implementations of or processing in method 800 depicted in FIGS. 8A and 8B may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 800 depicted in FIGS. 8A and 8B begins in step 805 of FIG. 8A.

In step 810, a set of empty document vectors are received. In various embodiments, all previous document vectors generated using Random Indexing are initialized to zero. In step 815, a first document for which to generate a document vector is selected. In step 820, all terms that appear in the selected document are determined.

In step 825, a first term that appears in the document is selected. In step 830, frequency of the term in the document is determined. In step 835, frequency of the term in a corpus (e.g., one that includes the selected document) is determined. In step 840, a term vector of the selected term is added to a document vector for the selected document. The term vector may be scaled by the determined document term frequency and the determined corpus term frequency.

FIG. 8A continues in FIG. 8B, where in step 845, a determination is made whether any terms remain in the selected document. If one or more terms remain in the selected document, in step 850, the next term is selected. Processing is then repeated for the next term in step 830 of FIG. 8A. If no documents remain in which the term appear, in step 855, the document vector is normalized. Each document vector may be normalized so the vector is of length 1.0.

In step 860, a determination is made whether any documents remain for which to generate a document vector. If one or more documents remain, in step 865, the next document is selected. Processing is then repeated for the next document in step 820 of FIG. 8A. If no documents remain for which to generate a document vector, FIG. 8B ends in step 870.

In various embodiments, the processing of FIGS. 7A, 7B, 8A, and 8B may constitute one training cycle as exemplified in FIG. 5B. The steps may be repeated as many cycles as needed. Typically, two training cycles may be sufficient to get a good representation of term and document spaces. In another aspect, processing system 100 may start with existing document vectors and term vectors and add new terms/document into it. In such a case, the additional documents simply add to the semantic space by reinforcing existing term and document vectors.

In some embodiments, processing system 100 may further capture positional information of terms. System 100 may use positional information and build a term and its neighbors as a way of limiting how a term's proximity defines its context. Accordingly, during indexing, processing system 100 may further capturing special positional information. Processing system 100 then may build a term-to-term projection based on the positional information.

Accordingly, in various embodiments, a semantic space may be build using a linear scan of terms, followed by a scan of documents. In contrast to LSA and other dimensionality reduction techniques, processing system 100 requires much less memory and CPU resources for semantic space construction. This is primarily because matrix operations such as singular value decomposition (SVD) are computationally intensive, and requires both the initial term-document matrix and intermediate matrices to be manipulated in memory. In contrast, semantic vectors can be built for a portion of the term space with a portion of the index. It is also possible to scale simply by employing persistence to disk at appropriate batching levels, thus scaling to unlimited term and document collections. Additionally, in other aspects, processing system 100 may more easily parallelize vector space building for distribution across multiple systems. This allows parallel computation of the space, allowing for a distributed algorithm to work on multiple term-document spaces simultaneously. This can dramatically increase the availability of concept search capabilities to very large matters, and within time constraints that are typically associated with large electronic discovery projects.

Moreover, processing system 100 may build a semantic space incrementally, as new batches of data are received, without having to build the entire space from scratch. This is a very common scenario in electronic discovery, as an initial batch of document review needs to proceed before all batches are collected. It is also fairly common for the scope of electronic discovery to increase after early case assessment. Finally, processing system 100 may be tune a semantic space using parameter selection such as dimension selection, similarity function selection and selection of term-term vs. term-document projections. These capabilities allow electronic discovery project teams to weigh the costs of computational resources against the scope of documents to be retrieved by the search. If a matter requires a very narrow interpretation of relevance, the concept search algorithm can be tuned and iterated rapidly. Like other statistical methods, semantic spaces retain their ability to work with a corpus including multiple languages, multiple data types, encoding types etc., which is a key requirement for e-discovery. This is because processing system 100 does not rely on linguistic priming or linguistic rules for its operation.

Resource requirements for building a semantic vector space is an important consideration. Time and space complexity of semantic space algorithms can be evaluated as a function of corpus size, both from the initial construction phase and for follow-on search and retrievals. Performance measurements for both aspects were characterized for four different corpora, as indicated in Table 2.

TABLE 2

| Corpus | Demo case | Reuters Collection | EDRM Enron Data set | TREC Tobacco Corpus |
|---|---|---|---|---|
| Number of PST Files | 12 | — | 171 | — |
| Number of Emails | 19302 | — | 428072 | — |
| Number of Attachments and/or Files | 2917 | 21578 | 305508 | 6,270,345 |
| Number of Term Vectors (email) | 49210 | — | 251110 | — |
| Number of Document Vectors (email) | 17261 | — | 402607 | — |
| Number of Term Vectors (attachments) | 57964 | 63210 | 189911 | 3,276,880 |
| Number of Doc Vectors (attachments) | 2153 | 21578 | 305508 | 6,134,210 |
| Number of Clusters (email) | 542 | — | 3996 | — |
| Number of Clusters (attachments) | 105 | 134 | 2856 | 210,789 |

As can be observed, term vectors and document vectors vary based on the characteristics of the data. While the number of document vectors closely tracks the number of documents, the number of term vectors grows more slowly. This is the case even for OCR-error prone ESI collections, where the term vector growth moderated as new documents were added to the corpus.

In some aspects, space complexity of a semantic space model is linear with respect to the input size. Partitioning of a problem across certain term boundaries and persisting the term and document vectors can provide for increased scalability. For example, a 4 million document collection with 20 million terms, processing system 100 may break apart the term collection into 20 sub-spaces of a million terms each. Since term vector stores do not rely on other term vectors— they only rely on document vectors, the space can be partitioned effectively. For the above case, processing system 100 may implement scaling by sharding the terms in a multi-pass algorithm. Since both the semantic space construction and its use during concept search are scalable by use of external disk-resident structures, memory requirements are modest. One implementation of the algorithm requires memory space for tracking one million term and document vectors, which is about 2 GB, for a semantic vector dimension of 200.

Time for semantic space construction is linear on the number of terms and documents. For a very large corpus, the space construction requires periodic persistence of partially constructed term and document vectors and their clusters. A typical configuration persists term vectors for each million terms, and documents at each million documents. As an example, the NIST TextRetrieval Conference (TREC) Legal Track supplied tobacco corpus would require 4 term subspace constructions, with six document partitions, yielding 24 data persistence invocations. If we consider the number of training cycles, each training cycle repeats the same processes. As an example, the TREC tobacco corpus with two training cycles involves 48 persistence invocations. For a corpus of this size, persistence adds about 30 seconds for each invocation.

TABLE 3

| Performance Item | Vector Construction (minutes) | Cluster Construction (minutes) |
|---|---|---|
| Demo case | 2 | 1 |
| Reuters-21578 Collection | 1 | 1 |
| EDRM Enron data set | 40 | 15 |
| TREC Tobacco Corpus | 490 | 380 |

Table 3 provides measurements that were taken on a commodity Dell PowerEdge R710 system, with two Quad Xeon 4500 processors at 2.1 GHz CPU and 32 GB amount of memory.

Partitioning and Clustering

Figure 9A:
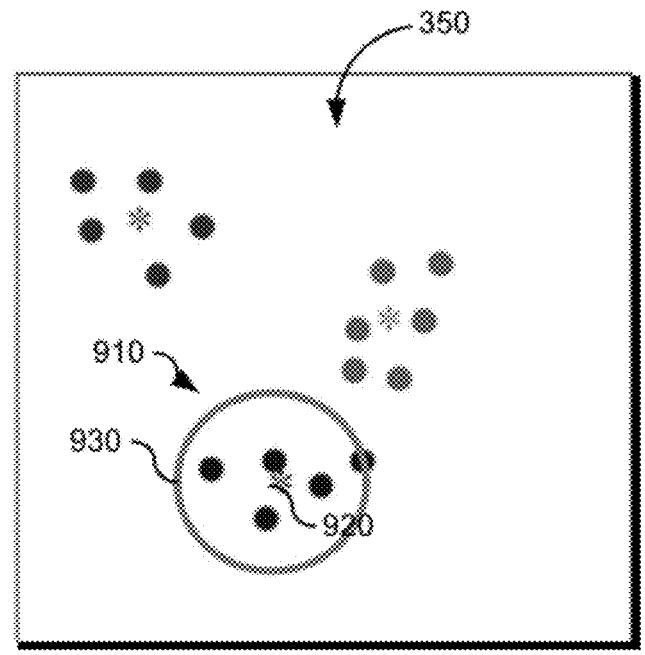
FIG. 9A is an illustration of a document space divided into one or more clusters in one embodiment according to the present invention.

In still further embodiments, processing system 100 may partition or cluster document and/or term vector spaces. FIG. 9A is an illustration of semantic space 350 of FIG. 3 divided into one or more clusters in one embodiment according to the present invention. Processing system 100 may perform text clustering based on semantic vectors to generate one or more cluster representing "concepts" or "topics." For example processing system 100 may identify document clusters based on document vectors and create concepts or topics from these document clusters. Naming of concepts or topics may be based on frequent terms appearing in members of the cluster.

One valuable usage item is the centroid of each cluster, which is a centroid representation of all cluster members. For example, cluster 910 is associated with centroid 920 which is a vector representing the "center" of all documents that are members of cluster 910. All documents that are members of cluster 910 also all within radius 930. Radius 930 may be a maximum radius around centroid 920 that encompasses the document vectors of all documents that are members of cluster 910.

Figure 9B:
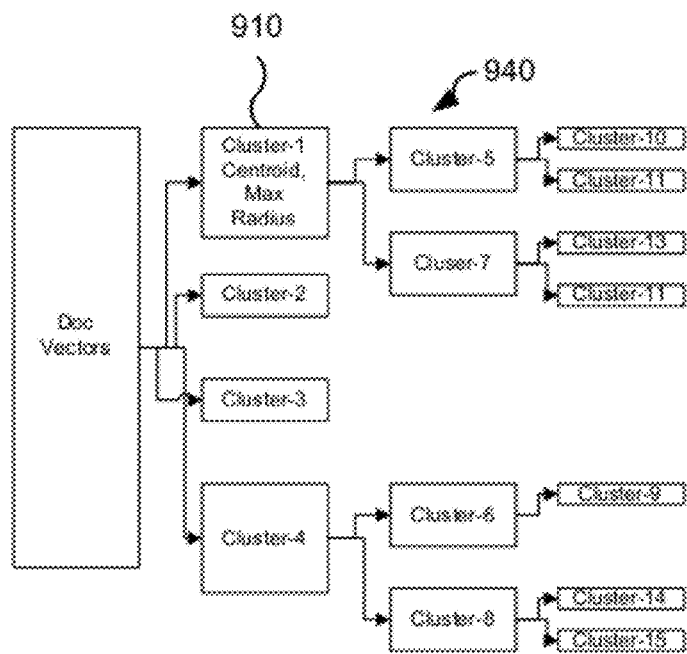
FIG. 9B is an illustration of one or more cluster hierarchies in one embodiment according to the present invention.

In some aspects, a clustering algorithm may be used that constructs hierarchical clusters. FIG. 9B is an illustration of one or more cluster hierarchies in one embodiment according to the present invention. In one example, processing system 100 may incorporate an algorithm for hierarchical kMeans clustering where a cosine distance metric is used for similarity. For each cluster, processing system 100 may determine a centroid and its max radius (e.g., determined as a cosine distance from the centroid). All vectors that belong to a cluster fall within the max radius. In this example, cluster 910 includes set 940 of sub-clusters. Each sub-cluster may have a centroid and maximum radius. Accordingly, obtaining one topic/cluster may further show all sub-clusters in a hierarchy. Further, naming of topics may be based on frequent terms appearing in the sub-clusters below a cluster as well as the members of the cluster. Thus, processing system 100 may implement one or more clustering algorithms that divide data into meaningful sub-groups (clusters) so that intra-cluster similarity is maximized while inter-cluster similarity is minimized. Some techniques are further discussed in relation to the clustering research package from University of Minnesota called CLUTO.

Accordingly, in some aspects, processing system 100 allows visualization and other treatment (such as tagging) of like vectors (as a single concept or topic). Processing system 100 provides for narrowing/partitioning search result spaces into smaller more manageable spaces, navigation paths through a large collection of documents, and the discovery of other documents through membership in clusters. Processing system 100 may further cluster key-vector pairs and store the pairs using an indexing method that facilitates vector comparisons for items only within a specific set of clusters as further discussed below. Cluster-ordered index has the benefit that given an object, its cluster can be identified quickly using an index.

Figure 10:
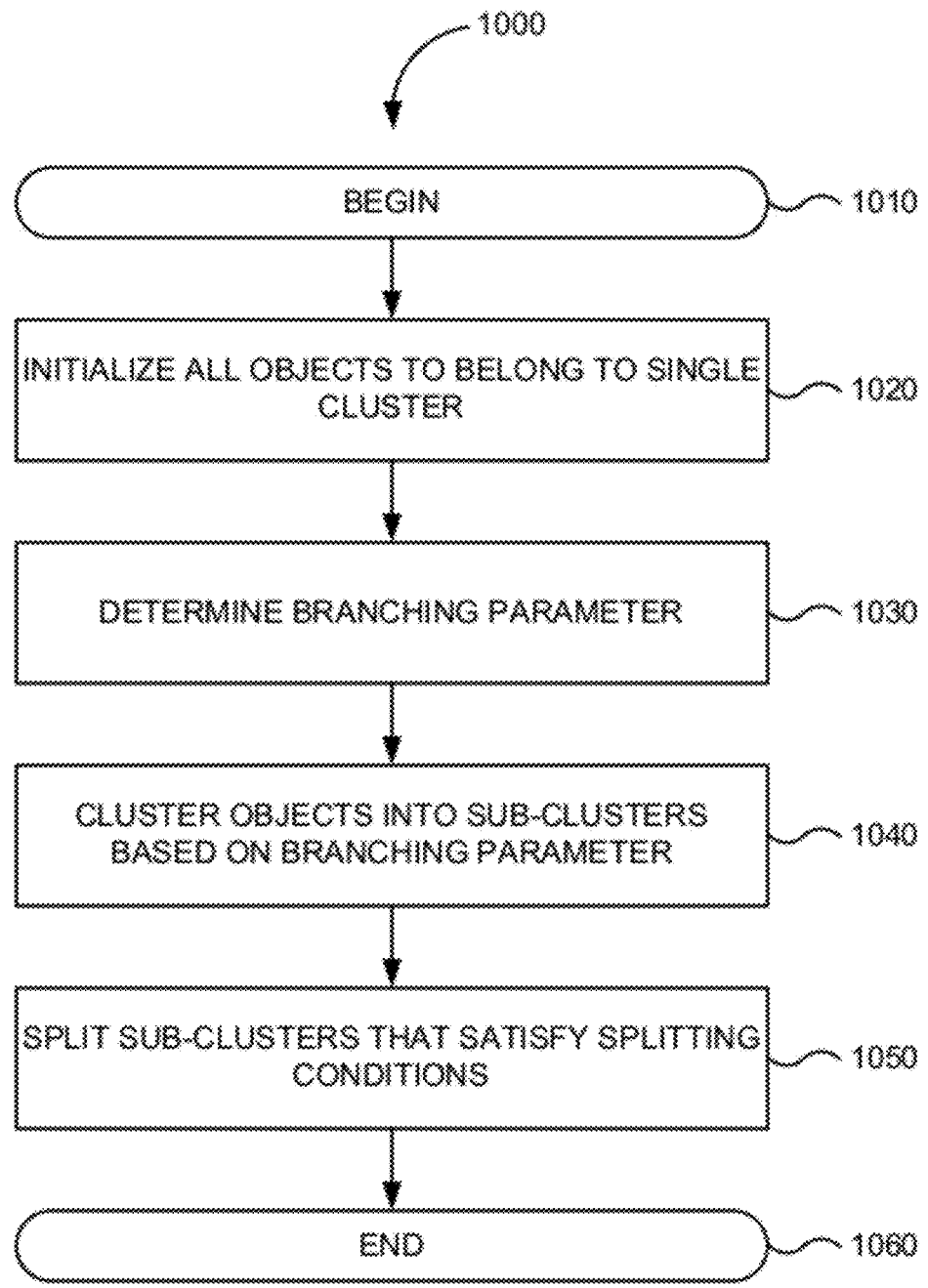
FIG. 10 is a flowchart of a method for performing clustering in a semantic space in one embodiment according to the present invention.

FIG. 10 is a flowchart of method 1000 for performing clustering in a semantic space in one embodiment according to the present invention. Implementations of or processing in method 1000 depicted in FIG. 10 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1000 depicted in FIG. 10 begins in step 1010.

In step 1020, all objects in a semantic space are initialized to belong to a single cluster. In step 1030, a branching parameter is determined. In some embodiments, a branching parameter or k-value may be indicative of a number of branches. Values such as 10-way branching may be used. In step 1040, objects are clustered into sub-clusters based on the branching parameter. For example, processing system 100 may use kMeans clustering to generate a number of sub-clusters. In another example, processing system 100 may use agglomerative hierarchical clustering to build a hierarchy from individual elements by progressively merging clusters.

In some embodiments, a single invocation of kMeans clustering by processing system 100 may include allocating a number of cluster mappings to be same size as the number of objects. Cluster centroids are allocated to be the number of clusters, each of a predetermined number of dimensions. Cluster mappings are then initialized randomly where each object vector is assigned to a random cluster. Processing system 100 then may iterate as many times as needed computing new mappings. Processing system 100 then may initialize each cluster centroid vector to zero. For each object, processing system 100 retrieves its vector and adds it to the cluster's centroid vector. After all objects are processed, processing system 100 then normalizes the centroid vector.

Processing system 100 thereafter computes new mappings for each object vector, based on the nearest centroid vector (i.e., the centroid that is closest to it) and changes the cluster for that object if its centroid is not its current mapping. By tracking the number of cluster mapping changes, and if there are any changes, processing system 100 continues to iterate for new mappings.

In step 1050, sub-clusters are split that satisfy splitting conditions. For example, for any sub-cluster that qualifies for splitting, processing system 100 may recursively invoke clustering on that sub-cluster. Continuing the example above, if a member cluster member was re-assigned to a child sub-cluster, remove it from the current cluster. Processing system 100 stops when there are no new clusters generated. FIG. 10 ends in step 1060.

In various embodiments, processing system 100 may utilize measurement criteria for determining whether to split a sub-cluster. For example, for a cluster in question, processing system 100 may determine the centroid and its vector. For all vectors that belong to that cluster, processing system 100 may determine a cosine distance of the vector from the centroid. If the combined normalized distance for all vectors is below a certain threshold value, processing system 100 may determine that the cluster should not be split further. If the distance is above a certain value, processing system 100 may split the cluster further.

In various embodiments, processing system 100 implements clustering using a variety of forms. For example, processing system 100 may use Cluster Mapping where a mapping parallels all root-level objects that were clustered. The mapping maps a document or term vector at the root level to the cluster it belongs. In another example, processing system 100 may use Cluster Partition where all object members that belong to a cluster and sub-cluster members are contained at the child level. In another example, each cluster level contains a centroid, which represents the centroid of all the members and clusters that belong under it.

In further embodiments, processing system 100 may cluster search results into a set of clusters. For search results that satisfy certain conditions (such as being limited to around 100K objects), processing system 100 may build document vectors from term vectors and build a new document vector space specific to only the search results. Processing system 100 may further take only the search results and build a new hierarchical cluster to cluster results. This has the advantage that any incrementally added documents (i.e., those that were not part of the corpus used to build the term or document vectors) can be part of the search results.

Storage and Retrieval of a Semantic Space

Figure 11:
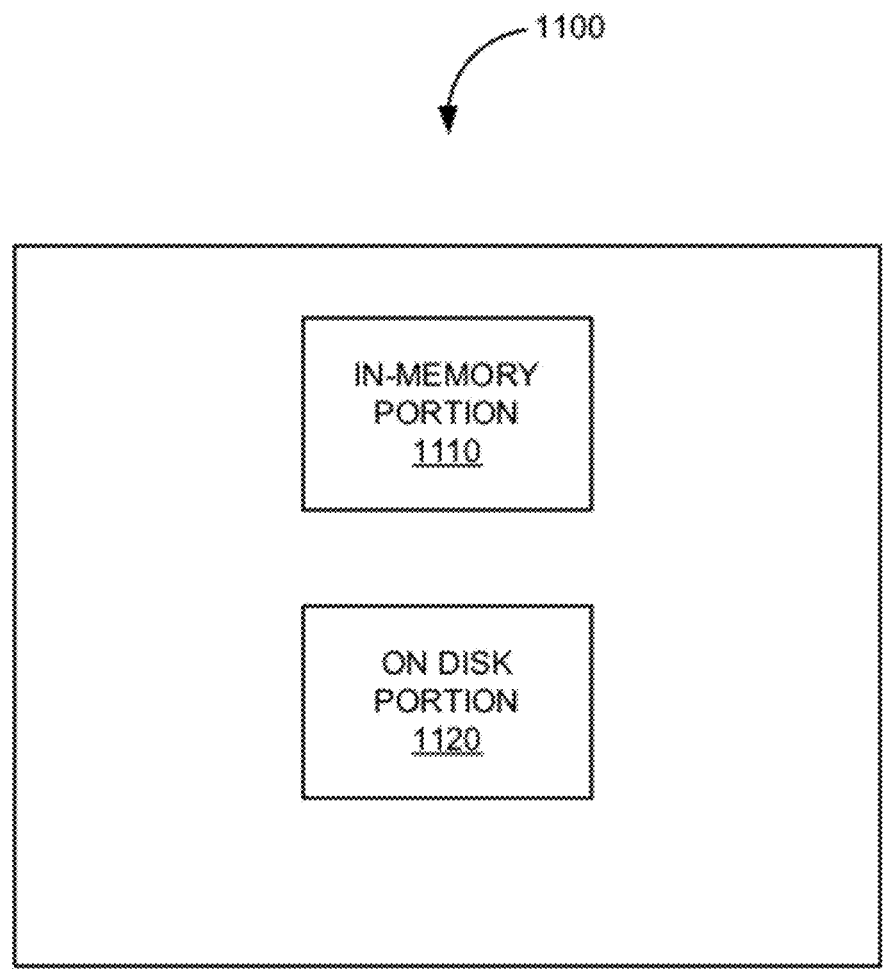
FIG. 11 is a block diagram illustrating persistent storage of a semantic space in one embodiment according to the present invention.

In some embodiments, processing system 100 may store term and document vectors of a semantic space in a persistent store so they can be reused, maintaining connections between the term vectors and document vectors. FIG. 11 is a block diagram illustrating persistent storage of vector space 1100 in one embodiment according to the present invention.

Both term vectors and document vectors, at their very basic level, may have a large collection of key-value pairs to be stored and accessed. In one aspect, an index key may be either a term for a term vector or a document ID for a document vector. A frequent retrieval process may be given a key to find its corresponding vector. To facilitate fast access to object vectors for a given an object, processing system 100 may provide an object index, with object-ordered storage in the persistent store. During retrievals, processing system 100 may maintain an object index entirely in one type of storage device (such as working memory/RAM associated with in-memory portion 1110), while key-vector pairs may be maintained in another type of storage device (such as on disk in a binary file associated with on-disk portion 1120). In order to scale the object index for very large vector stores, processing system 100 may create the index entries only for a small portion of the overall set of vectors. Accordingly, processing system 100 implements a retrieval with a binary search in the index to locate an entry closest to the query object, and then a linear scan in a small region of the persistent store. In one embodiment, processing system 100 may create the index entries using a configurable parameter, IndexRatio, such that if it is set to 128, processing system 100 may create one index entry in memory for every 128 disk entries.

In further embodiments, given a vector (either term or document vector), processing system 100 may find other vectors and their corresponding objects within a certain cosine distance of the supplied vector. Rather than simply scan an entire vector space linearly, performing a cosine measurement for every enumerated vector, processing system 100 may build vector-ordered storage and indexes to vector-ordered regions. In one embodiment, processing system 100 may split a vector into four equal-width segments and store the vector four times, with ordering based on the segment's order. Processing system 100 then may build four separate in-memory indexes into these segments.

Figure 12:
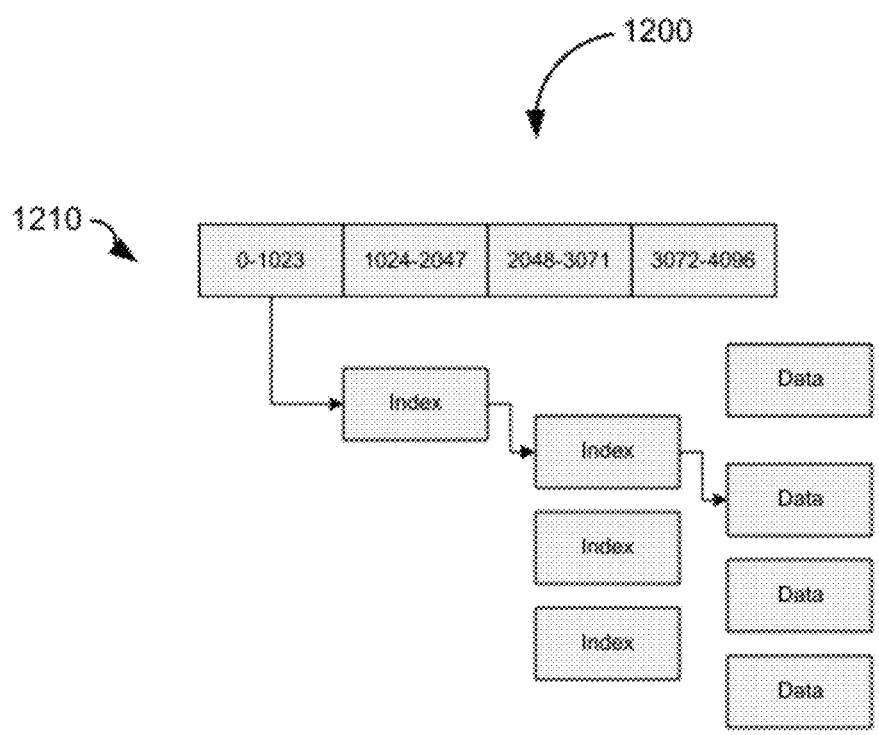
FIG. 12 is a block diagram illustrating a vector-ordered index associated with a semantic space in one embodiment according to the present invention.

FIG. 12 is a block diagram illustrating a vector-ordered index associated with semantic space 1200 in one embodiment according to the present invention. In this example, all data vectors in semantic space 1200 are broken into some number of discrete blocks. For the purposes of this discussion, a 4-way block split is considered. Assuming 4K bits in the vector, a 4-way split is shown. Processing system 100 may organize the first block to allow fir an efficient exact comparison of an initial 1024 bits with fuzzy comparison of the rest of the bits. Processing system 100 may further organize the second block where the second set of 1024 bits are positioned first. This allows efficient access to those vectors that have an exact match on the segment 1024-2047 bits but have a fuzzy match on 0-1023 and 2048-4096 bits. By storing four different representations of fuzzy vectors, processing system 100 is able to narrow the search space, and still perform reasonably small number of vector comparisons.

In another aspect, a cosine-match based retrieval may be used for identification of the top N matches of a given vector. During retrieval, processing system 100 may compare index vector entries for cosine similarity for each of a predetermined number of segments independently. For each segment, processing system 100 may identify the top N matches based on that segment, resulting in 10*N index entries. Processing system 100 then may scan the actual entries from each segment-ordered regions, collecting actual cosine similarity matches for each region. This may reduce the search space to 4*N*IndexRatio, so if N is set to the 20 highest entries, an index ratio of 128 gives a search space of 10K entries to be compared. In various aspects, this is a constant order search space and scales to any size of vector space.

Retrieval time for a search and time for building semantic space exploration are also characterized for various corpus sizes and complexity of queries. To facilitate a fast access to term and document vectors, processing system 100 may employ a purpose-build object store such as discussed above. The object store offers predictable and consistent access to a term or document semantic vector. For example, given a term or document, the object store provides random access and retrieval to its semantic vector within 10 to 30 milliseconds. In another aspect, the object store provides predictable and consistent access to all nearest neighbors (using cosine similarity and Euclidean distance measures) of a term and document vector. The object store has built-in hierarchical k-means based clustering. The search algorithm implements a cluster exploration technique that algorithmically chooses the smallest number of clusters to examine for distance comparisons. A cluster of 1000 entries is typically examined in 100 milliseconds or less.

Accordingly, in some instances, given the above object store and retrieval paths, retrieval times for searches range from 2 seconds to 10 seconds, depending in large part, on the number of nearest neighbors of a term, the number of document vectors to retrieve, and on the size of the corpus. The following Table 4 illustrates observed performance for the Enron corpus, using the cluster-directed search described above.

TABLE 4

| Performance Measurements | Average | Min | Max | STDEV |
|---|---|---|---|---|
| Term vector search | | | | |
| Clusters Examined | 417.84 | 2 | 849 | 274.72 |
| Clusters Skipped | 1001.25 | 19 | 1673 | 478.98 |
| Terms Compared | 24830.38 | 0 | 50154 | 16079.72 |
| Terms Matched | 21510.29 | 0 | 47294 | 15930.2 |

TABLE 4-continued

| Performance Measurements | Average | Min | Max | STDEV |
|---|---|---|---|---|
| Total Cluster Read Time (ms) | 129.39 | 0 | 405 | 88.23 |
| Total Cluster Read Count | 417.84 | 2 | 849 | 274.72 |
| Average Cluster Read Time (ms) | 0.29 | 0 | 3.75 | 0.18 |
| Total Search Time (ms) | 274.56 | 0 | 609 | 187.27 |
| Document vector search | | | | |
| Clusters Examined | 645.07 | 2 | 4911 | 646.01 |
| Clusters Skipped | 2348.29 | 4 | 5366 | 2166.25 |
| Docs Compared | 160463.16 | 361 | 305135 | 126313.64 |
| Docs Matched | 29560.16 | 0 | 81796 | 29523.07 |
| Total Cluster Read Time (ms) | 906.52 | 0 | 5148 | 748.88 |
| Total Cluster Read Count | 641.24 | 2 | 1746 | 631.89 |
| Average Cluster Read Time (ms) | 370.51 | 0 | 2574 | 440.39 |
| Total Search Time (ms) | 1172.86 | 0 | 5288 | 675.87 |

As is apparent from the above time measurements as well as number of clusters examined and skipped, concept searching can be offered to users with predictability and consistency, thereby making it possible for usage as an interactive, exploratory tool during the ECA, culling, analysis and review phases of electronic discovery.

Searching a Semantic Space

In various embodiments, once term and document vectors of a semantic space are created, they can be used for various kinds of searches. In one embodiment, a search for a concept may utilize a cosine distance measurement between a query vector and other vectors. Accordingly, identifying the nearest neighbor terms involves using the query vector to identify the other terms in a term vector store that are closest to it based on a determined cosine distance. Additionally, identifying all documents that are represented by a query can be achieved merely by identifying the closest documents to a query vector, again by way of cosine similarity.

Figure 13C:
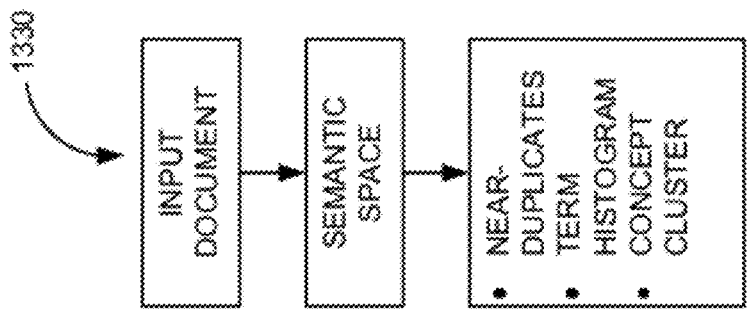
FIG. 13C illustrates an exemplary process where given an input document a semantic space is used to match documents to the input document documents according to predetermined conditions thereby yielding a document collection in one embodiment.
Figure 13B:
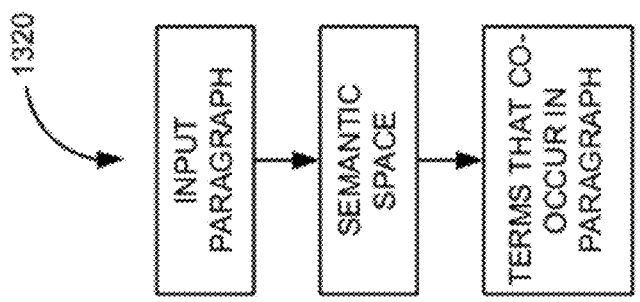
FIG. 13B illustrates an exemplary process where given an input paragraph a semantic space is used to locate related terms that co-occur in the paragraph in one embodiment.
Figure 13A:
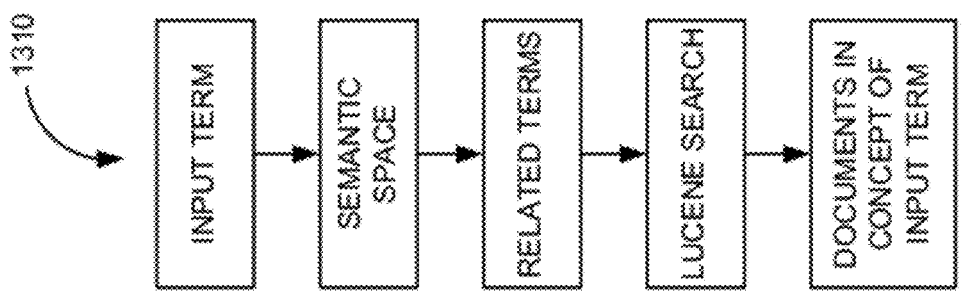
FIG. 13A illustrates an exemplary process where given a single input term a semantic space is used to locate related terms and documents in a concept of the input term in one embodiment.

For example, FIG. 13A illustrates an exemplary process 1310 where given a single input term (i.e., one that occurs in the original corpus that was indexed), processing system 100 uses the semantic space to locate related terms and documents in a concept of the input term. The related terms may include all other terms closest to the input term in concept. In some embodiments, processing system 100 may determine related terms by using the input term to locate a corresponding term vector, and then identifying other term vectors closest to the term vector of the input term, for example, using a cosine similarity function. The words that correspond to its closest vectors are closest to the input term because they either co-occur with the input term in the same document or co-occur through other words in other documents a transitive relationship between them. Given a set of terms, processing system 100 may obtain each term's term vector, merge them into a single vector, and then search for other term vectors that are closest to the merged vector. Accordingly, processing system 100 may find several words (e.g., helmet or touchdown) that are conceptually related to an input term (e.g., football). Given a term or set of terms, processing system 100 may find all documents by using the term vectors and the corresponding words and performing a Lucene search to find all documents containing the term.

In another example, FIG. 13B illustrates an exemplary process 1320 where given an input paragraph, processing system 100 uses the semantic space to locate related terms that co-occur in the paragraph. In yet another example, FIG. 13C illustrates an exemplary process 1330 where processing system 100 determines those documents that match an input document according to predetermined conditions thereby yielding a document collection. In one aspect, processing system 100 pick only those documents that match a certain threshold, yielding a document collection of near or substantially duplicates of the input document. In another aspect, processing system 100 may use a cosine distance between a corresponding term vector and each document vector to pick only those documents that match a certain threshold, yielding a document collection in a concept defined by the input document. In yet another example, given a set of document vectors, it is possible to apply a clustering algorithm to cluster the document vectors. The set of document vectors can be the entire corpus or a subset from a search—the clustering algorithm simply clusters the set of document vectors. The choice of clustering algorithm and its parameters will define the quality and type of clusters (i.e., flat vs. hierarchical etc.).

Figure 14A:
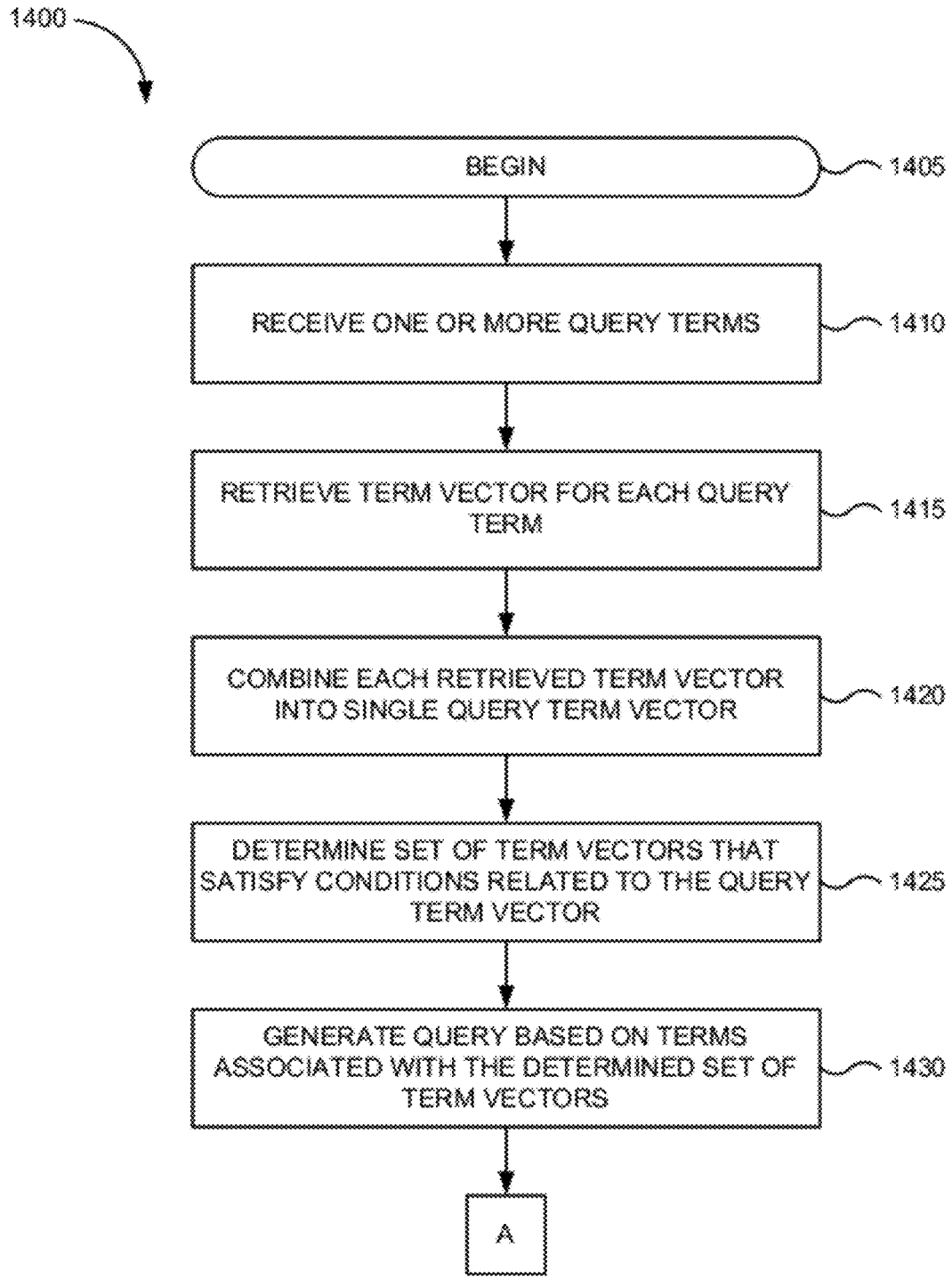
FIGS. 14A and 14B are a flowchart of a method for performing a concept search using a semantic space in one embodiment according to the present invention.
Figure 14B:
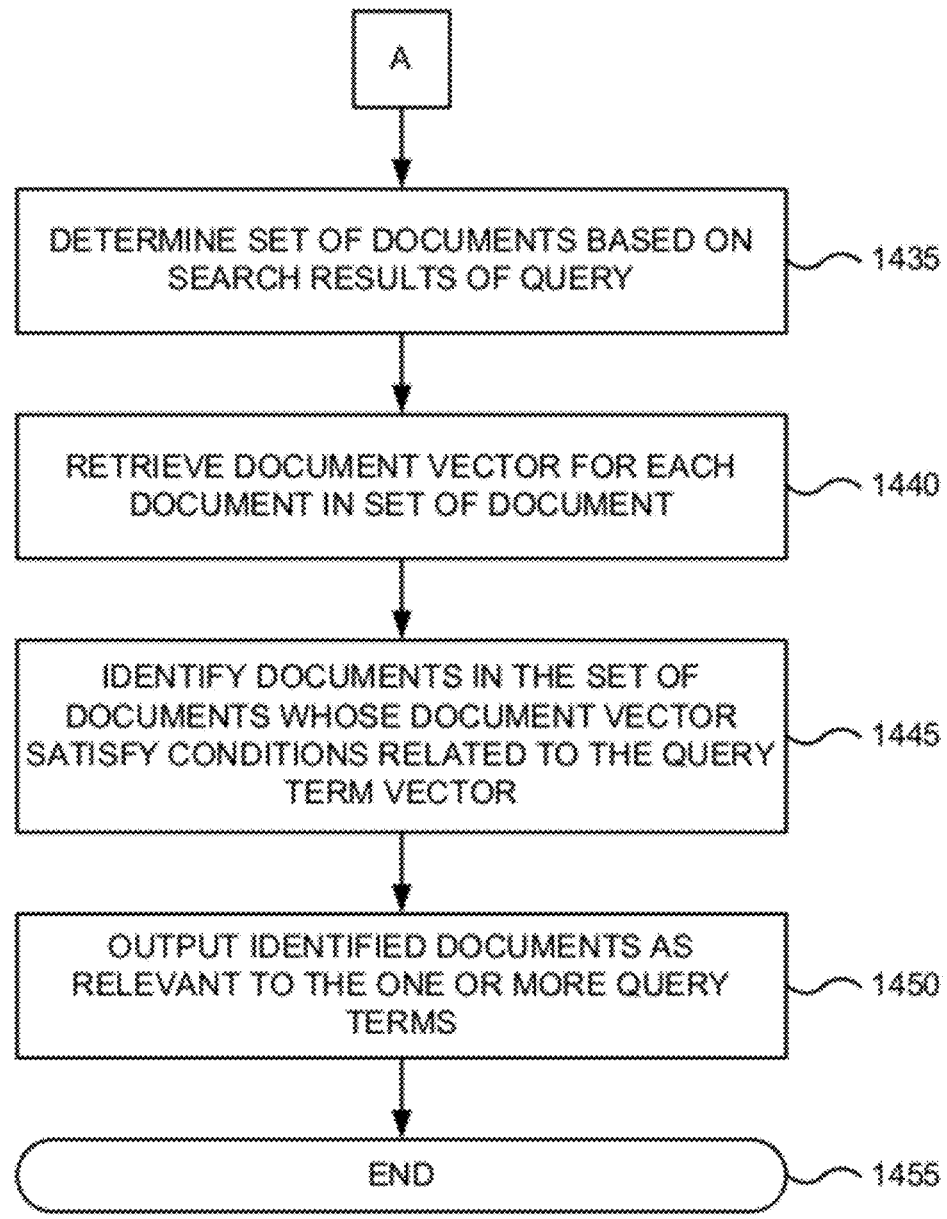

As discussed above, in various embodiments, processing system 100 can leverage a semantic space for concept searches. FIGS. 14A and 14B are a flowchart of method 1400 for performing a concept search using a semantic space in one embodiment according to the present invention. Implementations of or processing in method 1400 depicted in FIGS. 14A and 14B may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1400 depicted in FIGS. 14A and 14B begins in step 1405.

In step 1410, one or more query terms are received. For example, a user of processing system 100 may supply one or more search terms via a search interface as the one or more query terms. In another example, a user may select one or more terms or phrases from one or more documents as the one or more query terms. In yet another example, one or more terms may be automatically extracted from one or more documents as the one or more query terms.

In step 1415, term vectors are retrieved for each query term. In various embodiments, processing system 100 performs an object-key based lookup into a term vector space retrieving term vectors for all the query terms.

In step 1420, each retrieved term vector is combined into a single query term vector. In one example, if every term's vector is normalized, processing system 100 may perform vector addition to combine each retrieved term vector. In step 1425, a set of term vectors are determined that satisfy conditions related to the query term vector. In one embodiment, processing system 100 uses the term vector space to find all the neighbors of the query vector. For example, processing system 100 may find the closest 20 terms. In another example, processing system 100 may find all terms whose term vectors are within a predetermined radius of the query term vector.

In some aspects, processing system 100 identifies terms that satisfy a set of predetermined conditions related to a query term vector as representing the "concept" that the query terms define. Each concept is loosely defined in that terms that satisfy the predetermined conditions may not all be noun phrases or terms that have similar meanings.

In step 1430, a query is generated based on terms associated with the determined set of terms. For example, processing system 100 may use the closest determined terms to the one or more query terms and construct a Lucene OR search. The Lucene OR search may be constructed with boosts or other weighting or ranking influences. In further embodiment, the closest terms identified in step 1425 may be presented as a "preview" for a user to select from. Processing system 100 then may alter generation of the query. Method 1400 continues via step "A" in FIG. 14B.

In step 1435, a set of documents are determined based on the search results of the query. For example, a Lucene OR search as above may generated results of a large collection of documents. Specifically, a Lucene OR search may pick up every document that has one of the closest terms to the query terms, so it is over-inclusive.

In step 1440, document vectors are received for each document in the determine set of documents. In various embodiments, processing system 100 performs an object-key based lookup into a document vector space retrieving document vectors for all identified documents.

In step 1445, documents in the determined set of documents are identified whose document vectors satisfy conditions related to the query term vector. For example, processing system 100 may determine whether a cosine distance between each document vector and the query term vector exceeds a certain predetermined threshold. Those documents for which the conditions are satisfied may be identified as relevant to the concept that the query terms define.

In step 1450, the identified documents are output as relevant to the one or more query terms. FIG. 14B ends in step 1455.

Automated Review and Review Assist

Figure 15:
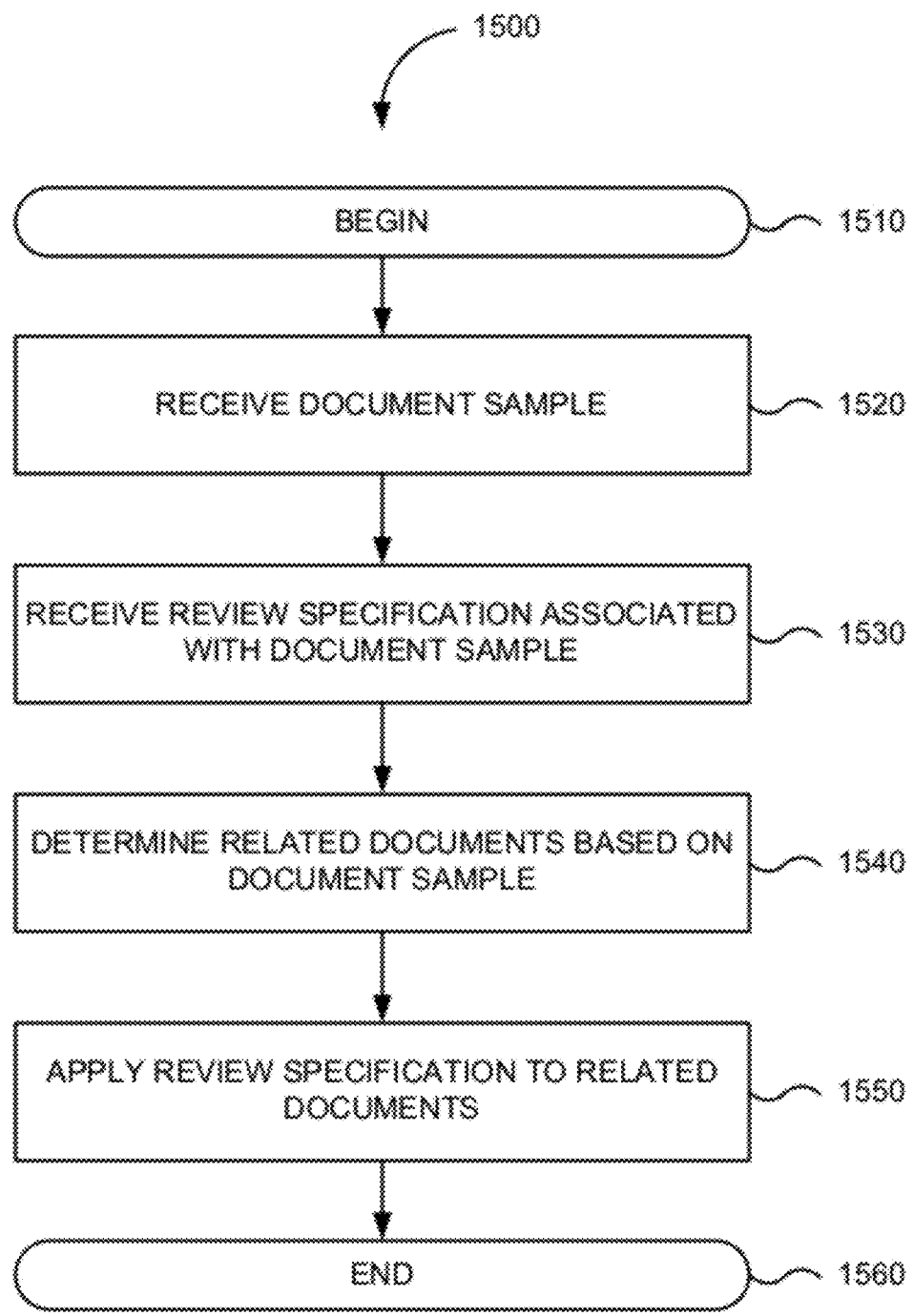
FIG. 15 is a flowchart of a method for automating a review using a semantic space in one embodiment according to the present invention.

In further embodiments, processing system 100 may used a semantic space as part of automated review. FIG. 15 is a flowchart of method 1500 for automating a review in one embodiment according to the present invention. Implementations of or processing in method 1500 depicted in FIG. 15 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1500 depicted in FIG. 15 begins in step 1510.

In step 1520, a document sample is received. For example, processing system 100 may retrieve selected documents for manual review. In step 1530, a review specification is received. A review specification includes information related to a review of a document sample. A review specification may identify tags, classifications, assessments, or other metadata added to or applied to documents in a document sample. For example, processing system 100 may receive a review specification generated based on an expert review on a small sample of documents.

In step 1540, documents related to the document sample are determined. Related documents may be the closest documents to the sample documents in a semantic space. In step 1550, the review specification is applied to the related documents. Accordingly, processing system 100 can apply assessments made on a small sample of documents by an expert review to other documents that are closest to the sample documents according to the semantic space. Processing system 100 may determine documents that are closest to each document in the sample and apply classifications, tags, or other metadata (e.g., privilege, confidentiality, or security attributes) to those documents in the same way. FIG. 15 ends in step 1560.

Figure 16:
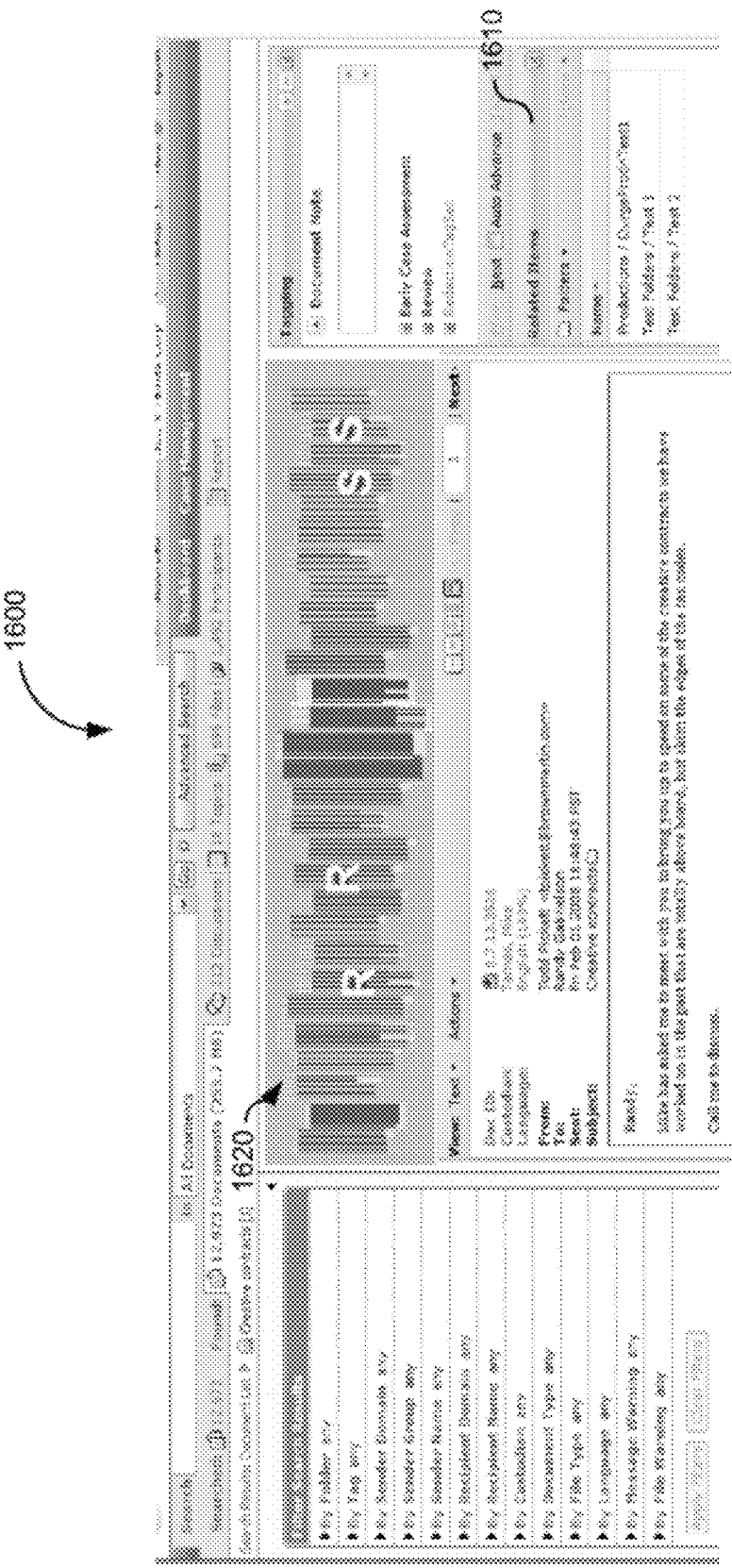
FIGS. 16 and 17 are illustrations of graphical user interfaces having one or more elements for interacting with a semantic space generated in one embodiment according to the present invention.
Figure 17:
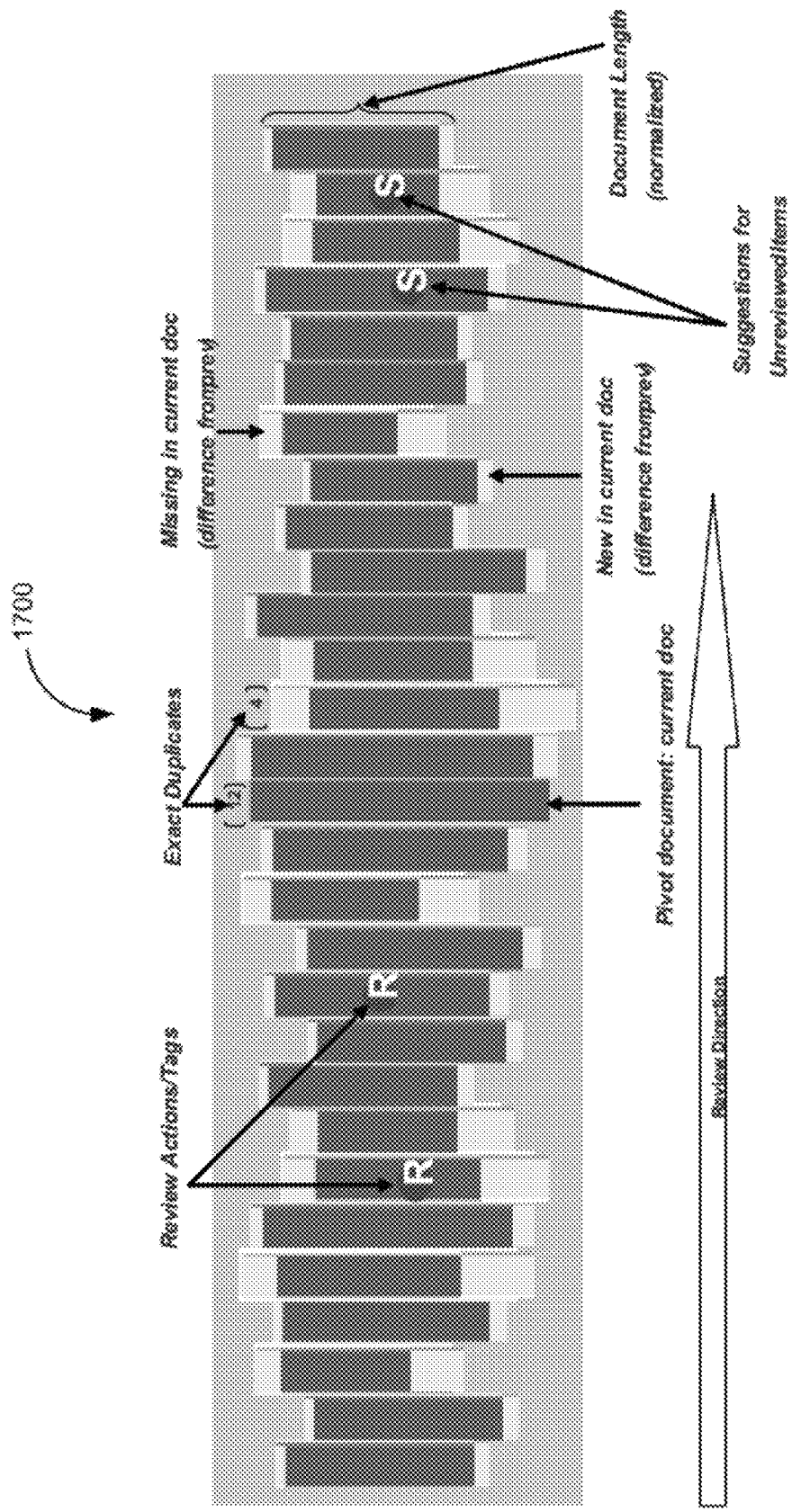

FIGS. 16 and 17 are illustrations of a graphical user interface having one or more elements for assisting in a review using a semantic space in one embodiment according to the present invention. In some embodiments, processing system 100 may assist in a document review process by suggesting that a document be tagged in a particular way based on the review assessment of other documents (either by the same reviewer or by another reviewer). For example, a user of user interface 1600 may interact with one or more related items using "Related Items" button 1610. One or more visualizations of related items determined using a semantic space may be displayed in area 1620. Processing system 100 may use a semantic vector search to find other closely aligned documents with a pivot document under current review.

FIG. 17 further details aspects of at least one visualization of related items in area 1620 of FIG. 16. In this example, visualization 1700 indicates the current document and how many other documents are duplicates of the current document and any formerly reviewed documents (i.e., those to the left of the pivot document) and any documents pending review (i.e., those to the right of the pivot document). Visualization 1700 may further indicate differences between the pivot document and other related documents. For example, visualization 1700 may visually indicate an amount of information in the pivot document that is missing from a related document and/or an amount of information in a related document that is missing from the pivot document.

Visualization 1700 may further indicate tags or other review actions that were provided to or otherwise occurred with respect to a related document that has already been reviewed. This information may assist the user in reviewing the pivot document. In another example, visualization 1700 may further indicate tags or other review actions that should be provided to or otherwise acted upon with respect to a related document that has not already been reviewed.

Hardware Overview

Figure 18:
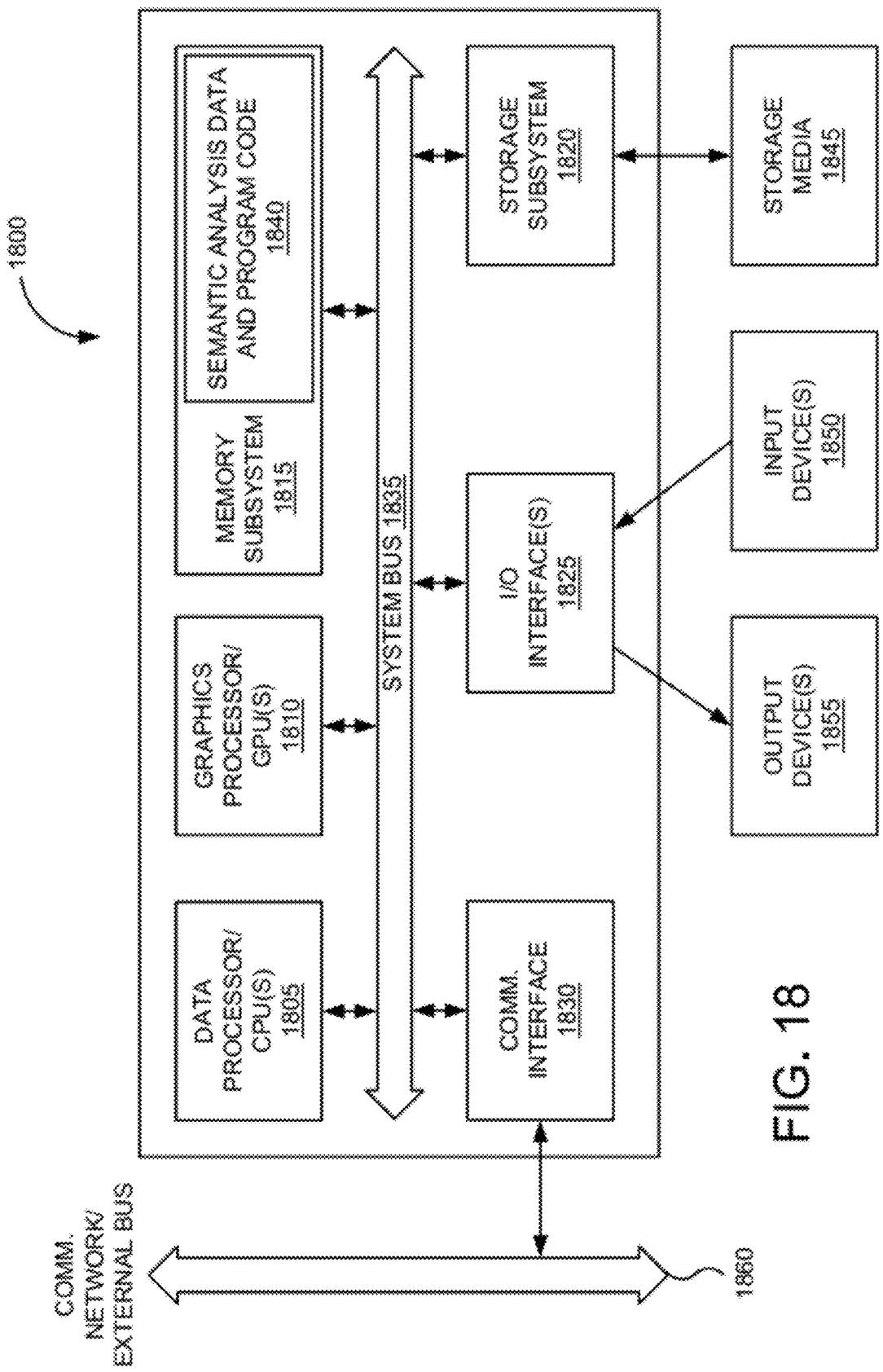
FIG. 18 is a block diagram of a computer system or information processing device that may incorporate an embodiment, be incorporated into an embodiment, or be used to practice any of the innovations, embodiments, and/or examples found within this disclosure.

FIG. 18 is a block diagram of computer system 1800 that may incorporate an embodiment, be incorporated into an embodiment, or be used to practice any of the innovations, embodiments, and/or examples found within this disclosure. FIG. 18 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 1800 can include hardware and/or software elements configured for performing logic operations and calculations, input/output operations, machine communications, or the like. Computer system 1800 may include familiar computer components, such as one or more one or more data processors or central processing units (CPUs) 1805, one or more graphics processors or graphical processing units (GPUs) 1810, memory subsystem 1815, storage subsystem 1820, one or more input/output (I/O) interfaces 1825, communications interface 1830, or the like. Computer system 1800 can include system bus 1835 interconnecting the above components and providing functionality, such connectivity and inter-device communication. Computer system 1800 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 1805 can include hardware and/or software elements configured for executing logic or program code or for providing application-specific functionality. Some examples of CPU(s) 1805 can include one or more microprocessors (e.g., single core and multi-core) or micro-controllers. CPUs 1805 may include 4-bit, 8-bit, 12-bit, 16-bit, 32-bit, 64-bit, or the like architectures with similar or divergent internal and external instruction and data designs. CPUs 1805 may further include a single core or multiple cores. Commercially available processors may include those provided by Intel of Santa Clara, Calif. (e.g., x86, x86_64, PENTIUM, CELERON, CORE, CORE 2, CORE ix, ITANIUM, XEON, etc.), by Advanced Micro Devices of Sunnyvale, Calif. (e.g., x86, AMD_64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU(s) 1805 may also include one or more field-gate programmable arrays (FPGAs), application-specific integrated circuits (ASICs), or other microcontrollers. The one or more data processors or central processing units (CPUs) 1805 may include any number of registers, logic units, arithmetic units, caches, memory interfaces, or the like. The one or more data processors or central processing units (CPUs) 1805 may further be integrated, irremovably or moveably, into one or more motherboards or daughter boards.

The one or more graphics processor or graphical processing units (GPUs) 1810 can include hardware and/or software elements configured for executing logic or program code associated with graphics or for providing graphics-specific functionality. GPUs 1810 may include any conventional graphics processing unit, such as those provided by conventional video cards. Some examples of GPUs are commercially available from NVIDIA, ATI, and other vendors. The one or more graphics processors or graphical processing units (GPUs) 1810 may include any number of registers, logic units, arithmetic units, caches, memory interfaces, or the like. The one or more data processors or central processing units (CPUs) 1805 may further be integrated, irremovably or moveably, into one or more motherboards or daughter boards that include dedicated video memories, frame buffers, or the like.

Memory subsystem 1815 can include hardware and/or software elements configured for storing information. Memory subsystem 1815 may store information using machine-readable articles, information storage devices, or computer-readable storage media. Some examples of these articles used by memory subsystem 1870 can include random access memories (RAM), read-only-memories (ROMS), volatile memories, non-volatile memories, and other semiconductor memories. In various embodiments, memory subsystem 1815 can include semantic analysis data and program code 1840.

Storage subsystem 1820 can include hardware and/or software elements configured for storing information. Storage subsystem 1820 may store information using machine-readable articles, information storage devices, or computer-readable storage media. Storage subsystem 1820 may store information using storage media 1845. Some examples of storage media 1845 used by storage subsystem 1820 can include floppy disks, hard disks, optical storage media such as CD-ROMS, DVDs and bar codes, removable storage devices, networked storage devices, or the like. In some embodiments, all or part of semantic analysis data and program code 1840 may be stored using storage subsystem 1820.

In various embodiments, computer system 1800 may include one or more hypervisors or operating systems, such as WINDOWS, WINDOWS NT, WINDOWS XP, VISTA, WINDOWS 18 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 1800 may also include one or more applications configured to execute, perform, or otherwise implement techniques disclosed herein. These applications may be embodied as semantic analysis data and program code 1840. Additionally, computer programs, executable computer code, human-readable source code, or the like, and data may be stored in memory subsystem 1815 and/or storage subsystem 1820.

The one or more input/output (I/O) interfaces 1825 can include hardware and/or software elements configured for performing I/O operations. One or more input devices 1850 and/or one or more output devices 1855 may be communicatively coupled to the one or more I/O interfaces 1825.

The one or more input devices 1850 can include hardware and/or software elements configured for receiving information from one or more sources for computer system 1800. Some examples of the one or more input devices 1850 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1850 may allow a user of computer system 1800 to interact with one or more non-graphical or graphical user interfaces to enter a comment, select objects, icons, text, user interface widgets, or other user interface elements that appear on a monitor/display device via a command, a click of a button, or the like.

The one or more output devices 1855 can include hardware and/or software elements configured for outputting information to one or more destinations for computer system 1800. Some examples of the one or more output devices 1855 can include a printer, a fax, a feedback device for a mouse or joystick, external storage systems, a monitor or other display device, a communications interface appropriately configured as a transceiver, or the like. The one or more output devices 1855 may allow a user of computer system 1800 to view objects, icons, text, user interface widgets, or other user interface elements.

A display device or monitor may be used with computer system 1800 and can include hardware and/or software elements configured for displaying information. Some examples include familiar display devices, such as a television monitor, a cathode ray tube (CRT), a liquid crystal display (LCD), or the like.

Communications interface 1830 can include hardware and/or software elements configured for performing communications operations, including sending and receiving data. Some examples of communications interface 1830 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 1830 may be coupled to communications network/external bus 1880, such as a computer network, to a FireWire bus, a USB hub, or the like. In other embodiments, communications interface 1830 may be physically integrated as hardware on a motherboard or daughter board of computer system 1800, may be implemented as a software program, or the like, or may be implemented as a combination thereof.

In various embodiments, computer system 1800 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 1800.

As suggested, FIG. 18 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

REFERENCES

1) Blair, D. C. & Moran M. E. (1985). An evaluation of retrieval effectiveness for a full-text document-retrieval system. Communications of the ACM, 28, 298-299
2) Berry, Michael W.; Browne (October 2005). "Email Surveillance Using Non-negative Matrix Factorization". Computational & Mathematical Organization Theory 11 (3): 249-264. doi:10.1007/s10588-005-5380-5.
3) Scott Deerwester, Susan T. Dumais, George W. Furnas, Thomas K. Landauer, Richard Harshman (1990). "Indexing by Latent Semantic Analysis" (PDF). Journal of the American Society for Information Science 41 (6): 391-407. doi:10.1002/(SICI)1097-4571(199009)41:6<391::AID-ASI1>3.0.CO;2-9. http://lsi.research.telcordia.com/lsi/papers/JASIS90.pdf. Original article where the model was first exposed.
4) An Introduction to Random Indexing, MAGNUS SAHLGREN, SICS, Swedish Institute of Computer Science, Box 1063, SE-164 29 Kista, Sweden, mange@sics.se
5) Reflective Random Indexing and indirect inference: A scalable method for discovery of implicit connections, Trevor Cohen, Roger Schvaneveldt, Dominic Widdows, Center for Cognitive Informatics and Decision Making, School of Health Information Sciences, University of Texas, Houston, USA, Applied Psychology Unit, Arizona State University, Arizona, USA, Google Inc., USA
6) Widdows D, Ferraro K. Semantic vectors: a scalable open source package and online technology management application. In: 6th International conference on language resources and evaluation (LREC); 2008.
7) EDRM Enron Dataset, http://edrm.net/resources/datasets/enron-data-set-files
8) Precision and Recall explained, http://en.wikipedia.org/wiki/Precision_and_recall
9) Discounted Cumulative Gain, http://en.wikipedia.org/wiki/Discounted_cumulative_gain
10) Latent Dirichlet Allocation, http://en.wikipedia.org/wiki/Latent_Dirichlet_allocation

What is claimed is:

1. A method comprising:
receiving, at one or more computer systems, a plurality of documents;
for each term in a set of terms associated with each document in the plurality of documents, generating a term vector for the term with one or more processors associated with the one or more computer systems based on a set of randomly indexed document vectors associated with documents in the plurality of documents in which the term appears, wherein each of the randomly indexed document vectors comprises a set of values, each of the set of values being a random value;
storing each generated term vector in association with its corresponding term in a storage device associated with the one or more computer systems;
generating, with the one or more processors associated with the one or more computer systems, a document vector for each document in the plurality of documents based on a set of term vectors associated with terms that appear in the document, wherein the set of term vectors is merged into each document vector based on the frequency of each term in each document;
storing each generated document vector in association with its corresponding document in the storage device associated with the one or more computer systems;
generating, with the one or more processors associated with the one or more computer systems, a query term vector for one or more query terms based on term vectors for terms that correspond to the one or more query terms;
generating, with the one or more processors associated with the one or more computer systems, a query based on a set of terms whose term vectors satisfy one or more conditions related to the query term vector; and
executing, with the one or more processors associated with the one or more computer systems, the query to obtain a set of documents in the plurality of documents that are relevant to a concept defined by the one or more query terms.

2. The method of claim 1 wherein generating the term vector for the term based on the set of randomly indexed document vectors associated with documents in the plurality of documents in which the term appears comprises:
determining frequency of the term in a document; and
incorporating, into the term vector, a document vector associated with the document scaled based on the determined frequency of the term in the document.

3. The method of claim 1 wherein generating the document vector for each document in the plurality of documents based on a set of term vectors associated with terms that appear in the document comprises:
determining frequency of a term in the document;
determining frequency of the term in the plurality of documents; and
incorporating, into the document vector, a term vector associated with the term scaled based on the determined frequency of the term in the document and the determined frequency of the term in the plurality of documents.

4. The method of claim 1 wherein storing each generated term vector in association with its corresponding term in the storage device associated with the one or more computer systems comprises generating an object-ordered index.

5. The method of claim 1 wherein storing each generated term vector in association with its corresponding term in the storage device associated with the one or more computer systems comprises generating a vector-ordered index.

6. The method of claim 1 further comprising:
generating a set of document clusters based on the document vectors associated with each document in the plurality of documents; and
identifying a centroid associated with at least one cluster as a concept represented by the set of documents.

7. The method of claim 1 further comprising:
receiving a term vector associated with a selected term;
determining a set of terms wherein each term vector of a term in the set of terms satisfies one or more conditions related to the term vector associated with the selected term; and
generating information indicating that the set of terms are related to the selected term.

8. The method of claim 1 further comprising:
receiving a term vector associated with a selected term;
determining a set of terms wherein a term vector of a term in the set of terms satisfies one or more conditions related to the term vector associated with the selected term;
determining a set of documents based on the set of terms wherein a document vector of a document in the set of document satisfies one or more conditions related to term vectors of the set of terms; and generating information indicating that the set of documents are related to the selected term.

9. The method of claim 1 further comprising:

receiving a document vector associated with a selected document;

determining a set of documents wherein each document vector of a document in the set of documents satisfies one or more conditions related to the document vector associated with the selected document; and generating information indicating that the set of documents are related to the selected document.

10. The method of claim 1 further comprising:

receiving a review specification indicative of a review of a subset of documents in the plurality of documents;

determining whether a document vector of a document satisfies one or more conditions related to document vectors associated with document in the subset of documents; and applying the review specification to the document when the document vector of the document satisfies the one or more conditions related to document vectors associated with document in the subset of documents.

11. A non-transitory computer-readable medium storing a plurality of instructions that cause a computer to perform operations comprising:

generating, for each term in a set of terms associated with each document in a plurality of documents, a term vector for the term based on a set of randomly indexed document vectors associated with documents in the plurality of documents in which the term appears, wherein each of the randomly indexed document vectors comprises a set of values, each of the set of values being a random value;

storing each generated term vector in association with its corresponding term;

generating a document vector for each document in the plurality of documents based on a set of term vectors associated with terms that appear in the document, wherein the set of term vectors is merged into each document vector based on the frequency of each term in each document;

storing each generated document vector in association with its corresponding document;

generating a query term vector for one or more query terms based on term vectors for terms that correspond to the one or more query terms;

generating a query based on a set of terms whose term vectors satisfy one or more conditions related to the query term vector; and executing the query to obtain a set of documents in the plurality of documents that are relevant to a concept defined by the one or more query terms.

12. The computer-readable medium of claim 11 wherein generating the term vector for the term based on the set of randomly indexed document vectors associated with documents in the plurality of documents in which the term appears comprises:

determining frequency of the term in a document; and incorporating, into the term vector, a document vector associated with the document scaled based on the determined frequency of the term in the document.

13. The computer-readable medium of claim 11 wherein generating the document vector for each document in the plurality of documents based on a set of term vectors associated with terms that appear in the document comprises:

determining frequency of a term in the document;

determining frequency of the term in the plurality of documents; and incorporating, into the document vector, a term vector associated with the term scaled based on the determined frequency of the term in the document and the determined frequency of the term in the plurality of documents.

14. The computer-readable medium of claim 11 wherein storing each generated term vector in association with its corresponding term comprises generating an object-ordered index.

15. The computer-readable medium of claim 11 wherein storing each generated term vector in association with its corresponding term comprises generating a vector-ordered index.

16. The computer-readable medium of claim 11, wherein the operations further comprise:

generating a set of document clusters based on the document vectors associated with each document in the plurality of documents; and identifying a centroid associated with at least one cluster as a concept represented by the set of documents.

17. The computer-readable medium of claim 11, wherein the operations further comprise:

receiving a term vector associated with a selected term;

determining a set of terms wherein each term vector of a term in the set of terms satisfies one or more conditions related to the term vector associated with the selected term; and generating information indicating that the set of terms are related to the selected term.

18. The computer-readable medium of claim 11, wherein the operations further comprise:

receiving a term vector associated with a selected term;

determining a set of terms wherein a term vector of a term in the set of terms satisfies one or more conditions related to the term vector associated with the selected term;

determining a set of documents based on the set of terms wherein a document vector of a document in the set of document satisfies one or more conditions related to term vectors of the set of terms; and generating information indicating that the set of documents are related to the selected term.

19. The computer-readable medium of claim 11, wherein the operations further comprise:

receiving a document vector associated with a selected document;

determining a set of documents wherein each document vector of a document in the set of documents satisfies one or more conditions related to the document vector associated with the selected document; and generating information indicating that the set of documents are related to the selected document.

20. The computer-readable medium of claim 11, wherein the operations further comprise:

receiving a review specification indicative of a review of a subset of documents in the plurality of documents;

determining whether a document vector of a document satisfies one or more conditions related to document vectors associated with document in the subset of documents; and applying the review specification to the document when the document vector of the document satisfies the one or more conditions related to document vectors associated with document in the subset of documents.

* * * * *